(12) United States Patent
Sato

(10) Patent No.: US 9,521,070 B2
(45) Date of Patent: Dec. 13, 2016

(54) APPARATUS, INFORMATION PROCESSING METHOD AND INFORMATION PROCESSING SYSTEM

(71) Applicant: FUJITSU LIMITED, Kawasaki-shi, Kanagawa (JP)

(72) Inventor: Masahiro Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 118 days.

(21) Appl. No.: 14/479,500

(22) Filed: Sep. 8, 2014

(65) Prior Publication Data
US 2015/0117179 A1    Apr. 30, 2015

(30) Foreign Application Priority Data
Oct. 31, 2013 (JP) ................... 2013-226814

(51) Int. Cl.
| | |
|---|---|
| H04L 1/24 | (2006.01) |
| H04L 12/26 | (2006.01) |
| H04L 29/06 | (2006.01) |
| H04L 12/703 | (2013.01) |
| H04L 12/701 | (2013.01) |
| H04L 12/713 | (2013.01) |

(52) U.S. Cl.
CPC ............. H04L 45/28 (2013.01); H04L 45/00 (2013.01); H04L 45/586 (2013.01); *H04L 29/06* (2013.01)

(58) Field of Classification Search
CPC .... H04L 41/0668; H04L 41/065; H04L 45/00; H04L 45/28; H04L 29/06
USPC ....... 370/219, 220, 228, 252, 254, 389, 392, 370/216, 351; 718/1; 709/245, 230, 238
See application file for complete search history.

(56) References Cited

U.S. PATENT DOCUMENTS

| | | | |
|---|---|---|---|
| 6,556,547 B1 * | 4/2003 | Srikanth ................. | H04L 45/00 370/317 |
| 9,100,274 B1 * | 8/2015 | Ghosh .................... | H04L 45/586 |
| 2002/0184387 A1 | 12/2002 | Yamaya et al. | |
| 2010/0182926 A1 * | 7/2010 | Kubota ................... | H04L 45/28 370/252 |
| 2011/0292933 A1 * | 12/2011 | Rodriguez Perez .. | H04L 45/586 370/389 |

(Continued)

FOREIGN PATENT DOCUMENTS

JP    2003-51835    2/2003

*Primary Examiner* — Alpus H Hsu
*Assistant Examiner* — Camquyen Thai
(74) *Attorney, Agent, or Firm* — Staas & Halsey LLP

(57) ABSTRACT

An information processing apparatus includes a first port coupled to a first network, a second port coupled to a second network, a first memory, and a first processor coupled to the first memory and configured to execute first routing processing related to communication performed by the information processing apparatus and a first information processing apparatus coupled to the first port through the first network, execute second routing processing related to communication performed by the first information processing apparatus and a second information processing apparatus coupled to the second port through the second network, when a failure occurs in the first port, cause a third information processing apparatus coupled to both of the first and second networks to execute the first routing processing, and when a failure occurs in the second port, cause the third information processing apparatus to execute the second routing processing.

17 Claims, 30 Drawing Sheets

(56) References Cited

U.S. PATENT DOCUMENTS

| | | | |
|---|---|---|---|
| 2012/0120793 A1* | 5/2012 | Corti | H04L 45/04 370/228 |
| 2012/0185856 A1* | 7/2012 | Ashihara | G06F 9/4856 718/1 |
| 2012/0198096 A1* | 8/2012 | Leng | H04L 12/2856 709/245 |
| 2013/0201820 A1* | 8/2013 | Xiaoyong | H04L 41/06 370/220 |

* cited by examiner

FIG. 4

| VIRTUAL MACHINE | COMMUNICATION FROM VIRTUAL MACHINE TO TERMINAL | COMMUNICATION FROM TERMINAL TO VIRTUAL MACHINE |
|---|---|---|
| VIRTUAL MACHINE 100 | GROUP 3 | GROUP 1 |
| VIRTUAL MACHINE 200 | GROUP 4 | GROUP 2 |

FIG. 7

| GROUP | PRIORITY | VIRTUAL IP ADDRESS | VIRTUAL MAC ADDRESS | TRACKING INTERFACE |
|---|---|---|---|---|
| 1 | 100 | 2.2.2.4 | A | 102 |
| 2 | 100 | 2.2.2.5 | B | 102 |
| 3 | 100 | 1.1.1.3 | C | 101 |
| 4 | 100 | 1.1.1.4 | D | 101 |

FIG. 8

| GROUP | PRIORITY | VIRTUAL IP ADDRESS | VIRTUAL MAC ADDRESS | TRACKING INTERFACE |
|---|---|---|---|---|
| 1 | 99 | 2.2.2.4 | A | 202 |
| 2 | 99 | 2.2.2.5 | B | 202 |
| 3 | 99 | 1.1.1.3 | C | 201 |
| 4 | 99 | 1.1.1.4 | D | 201 |

FIG. 10

| VRRP GROUP | PRIORITY |
|---|---|
| 1 | 100 |
| 2 | 100 |
| 3 | 100 |
| 4 | 100 |

FIG. 11

| VRRP GROUP | PRIORITY |
|---|---|
| 1 | 99 |
| 2 | 99 |
| 3 | 99 |
| 4 | 99 |

FIG. 12

| IP ADDRESS | MAC ADDRESS |
|:---:|:---:|
| 2.2.2.5 | b |
| 1.1.1.5 | f |
| 1.1.1.6 | g |

FIG. 13

| MAC ADDRESS | OUTPUT INTERFACE |
|---|---|
| b | PORT 11 |
| A | INTERFACE 101 |
| B | INTERFACE 101 |

FIG. 14

| IP ADDRESS | NEXTHOP |
|---|---|
| 1.1.1.5 | 2.2.2.5 |
| 1.1.1.6 | 2.2.2.4 |

FIG. 15B

| PORT | VRRP GROUP | IP ADDRESS OF VM |
|---|---|---|
| 11 | 3 | 2.2.2.2 |
| 11 | 4 | 2.2.2.2 |
| 12 | 1 | 1.1.1.6 |
| - | 2 | 1.1.1.5 |

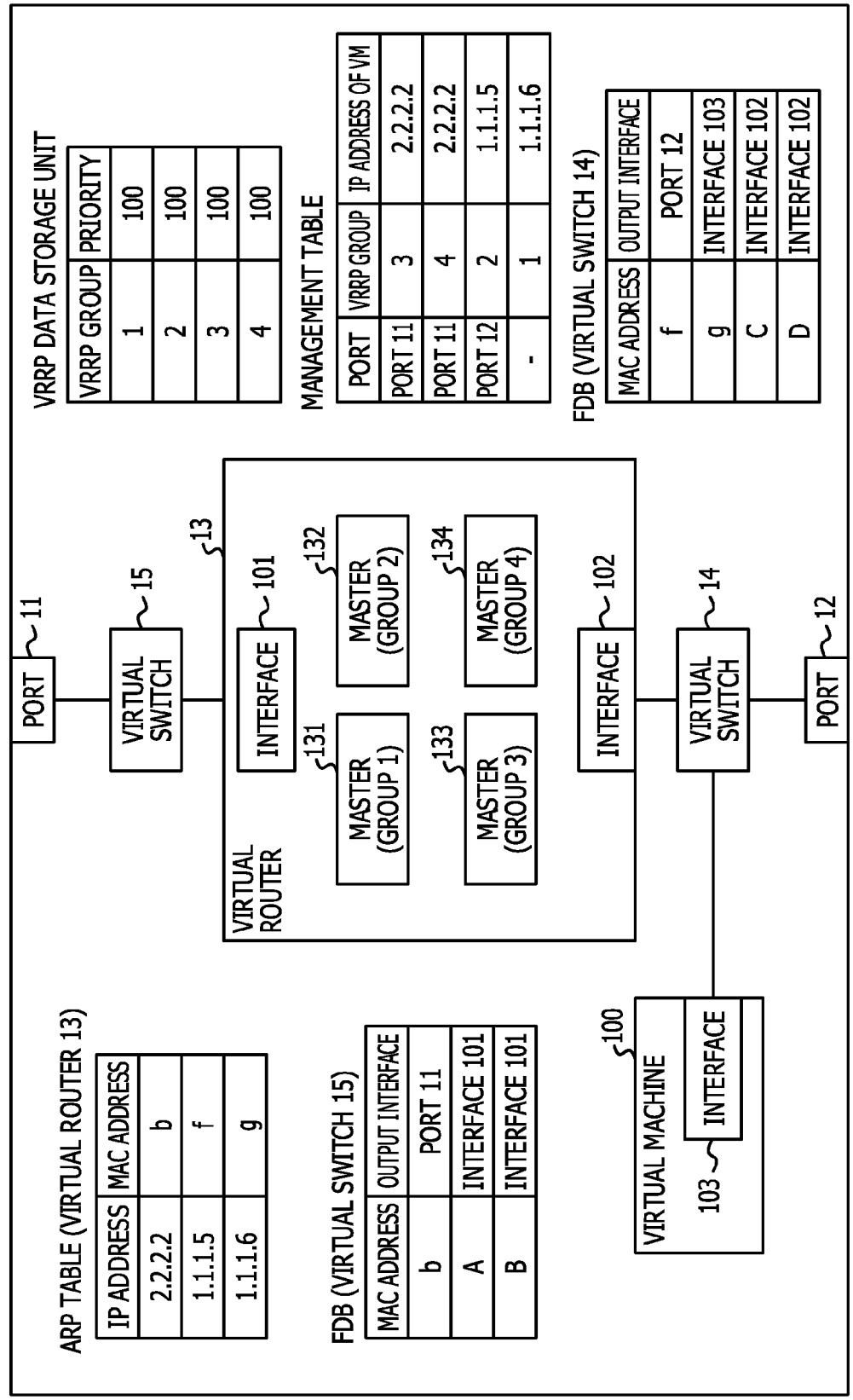

APPARATUS, INFORMATION PROCESSING METHOD AND INFORMATION PROCESSING SYSTEM

CROSS-REFERENCE TO RELATED APPLICATION

This application is based upon and claims the benefit of priority of the prior Japanese Patent Application No. 2013-226814, filed on Oct. 31, 2013, the entire contents of which are incorporated herein by reference.

FIELD

The embodiments discussed herein are related to an information processing apparatus, an information processing method and an information processing system.

BACKGROUND

A Virtual Router Redundancy Protocol (VRRP) is a protocol to make a node redundant in a network. In the VRRP, one of the nodes that belong to a specific VRRP group is handled as a master node and the rest of the nodes are handled as backup nodes. Normally, only the master node performs processing, and one of the backup nodes performs the processing instead when a failure occurs in the master node.

A virtual media access control address (MAC address) and a virtual Internet Protocol address (IP address) are assigned to each VRRP group. In a network using the VRRP, switches and the like are configured in the network such that data addressed to the virtual MAC address and the virtual IP address is transferred to the master node.

The VRRP is also used to make a virtual router redundant. For example, two virtual routers belonging to the same VRRP group are caused to operate on separate physical servers, and one of the virtual routers is handled as a master node and the other as a backup node. When a failure occurs in the physical server in such a situation, communication through the virtual routers is difficult to perform unless switching between the master node and the backup node is properly performed. Technologies in related art do not focus attention on such a problem. Related art documents include Japanese Laid-open Patent Publication No. 2003-51835.

SUMMARY

According to an aspect of the invention, an information processing apparatus includes a first port coupled to a first network, a second port coupled to a second network, a first memory, and a first processor coupled to the first memory and configured to execute first routing processing related to communication performed by the information processing apparatus and a first information processing apparatus coupled to the first port through the first network, execute second routing processing related to communication performed by the first information processing apparatus and a second information processing apparatus coupled to the second port through the second network, when a failure occurs in the first port, cause a third information processing apparatus coupled to both of the first and second networks to execute the first routing processing, and when a failure occurs in the second port, cause the third information processing apparatus to execute the second routing processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating communication performed by each VRRP group;
FIG. 7 is a diagram illustrating settings of each VRRP group;
FIG. 8 is a diagram illustrating settings of each VRRP group;
FIG. 10 is a diagram illustrating an example of data stored in a VRRP data storage unit;
FIG. 11 is a diagram illustrating an example of data stored in the VRRP data storage unit;
FIG. 12 is a diagram illustrating an example of an ARP table stored in an ARP table storage unit;
FIG. 13 is a diagram illustrating an example of data stored in an FDB of a virtual switch;
FIG. 14 is a diagram illustrating routing settings in a terminal;
FIG. 15B is a diagram illustrating an example of a management table stored in a management data storage unit;
FIG. 16 is a diagram illustrating a virtual router after completion of initial setting of the VRRP.

DESCRIPTION OF EMBODIMENT

The technology disclosed herein is intended to enable communication to be continued when a failure occurs in a physical server in which a virtual router operates.

Figure 1:
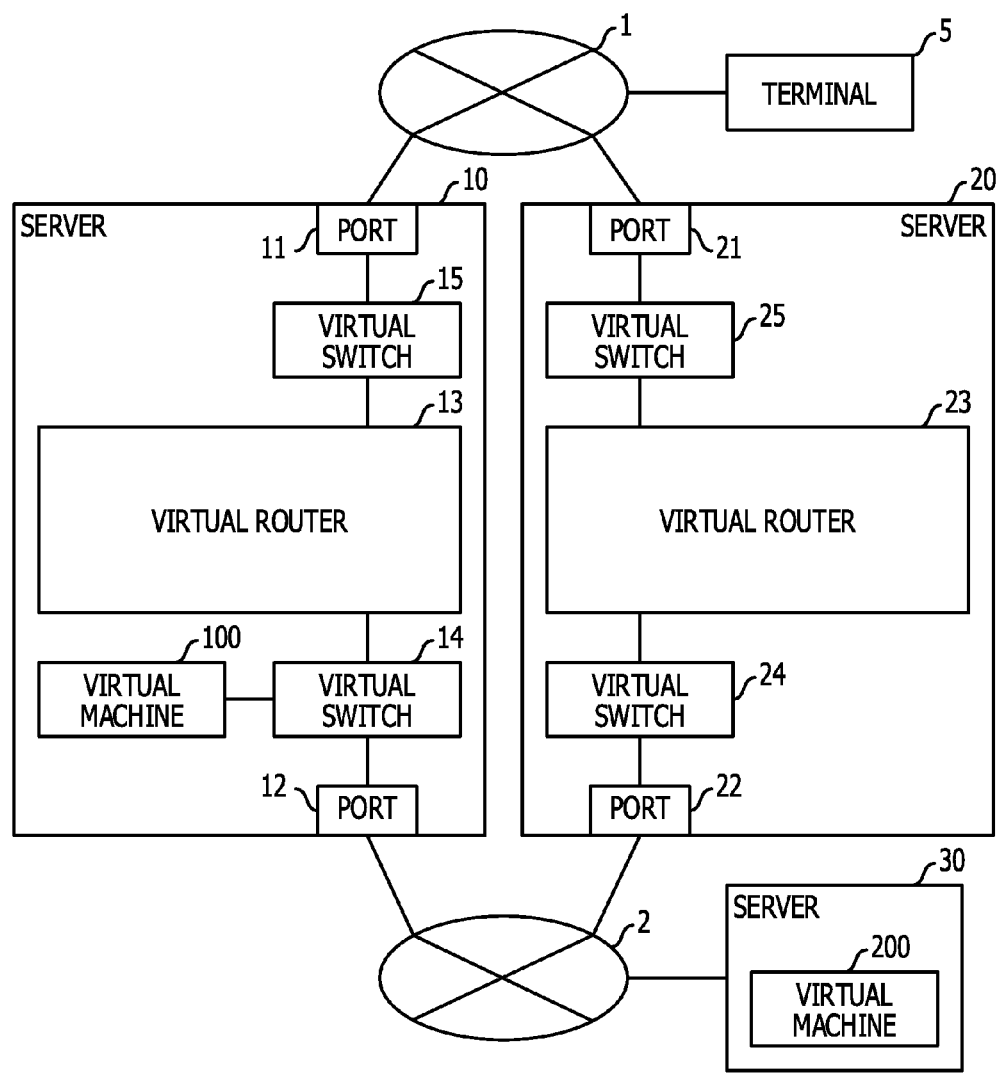
FIG. 1 is a diagram illustrating an overview of a system according to an embodiment.

FIG. 1 illustrates an overview of a system according to an embodiment. A server 10, a server 20, and a terminal 5 are coupled to a network 1. The server 10, the server 20, and a server 30 are coupled to a network 2. A virtual router 13 and a virtual router 23 are controlled by a VRRP. The terminal 5 communicates with a virtual machine 100 in the server 10 and a virtual machine 200 in the server 30 through either the virtual router 13 or the virtual router 23.

The server 10 has a port 11 and a port 12, which are physical ports. In the server 10, the virtual router 13, a virtual switch 14, a virtual switch 15, and the virtual machine 100 are realized. The server 10 is coupled to the network 1 through the port 11 and coupled to the network 2 through the port 12. The virtual router 13, the virtual switch 14, and the virtual switch 15 relay communication between the terminal 5 and the virtual machine 100 and communication between the terminal 5 and the virtual machine 200.

The server 20 has a port 21 and a port 22, which are physical ports. In the server 20, the virtual router 23, a virtual switch 24, and a virtual switch 25 are realized. The server 20 is coupled to the network 1 through the port 21 and coupled to the network 2 through the port 22. The virtual router 23, the virtual switch 24, and the virtual switch 25 relay communication between the terminal 5 and the virtual machine 100 and communication between the terminal 5 and the virtual machine 200.

Figure 2:
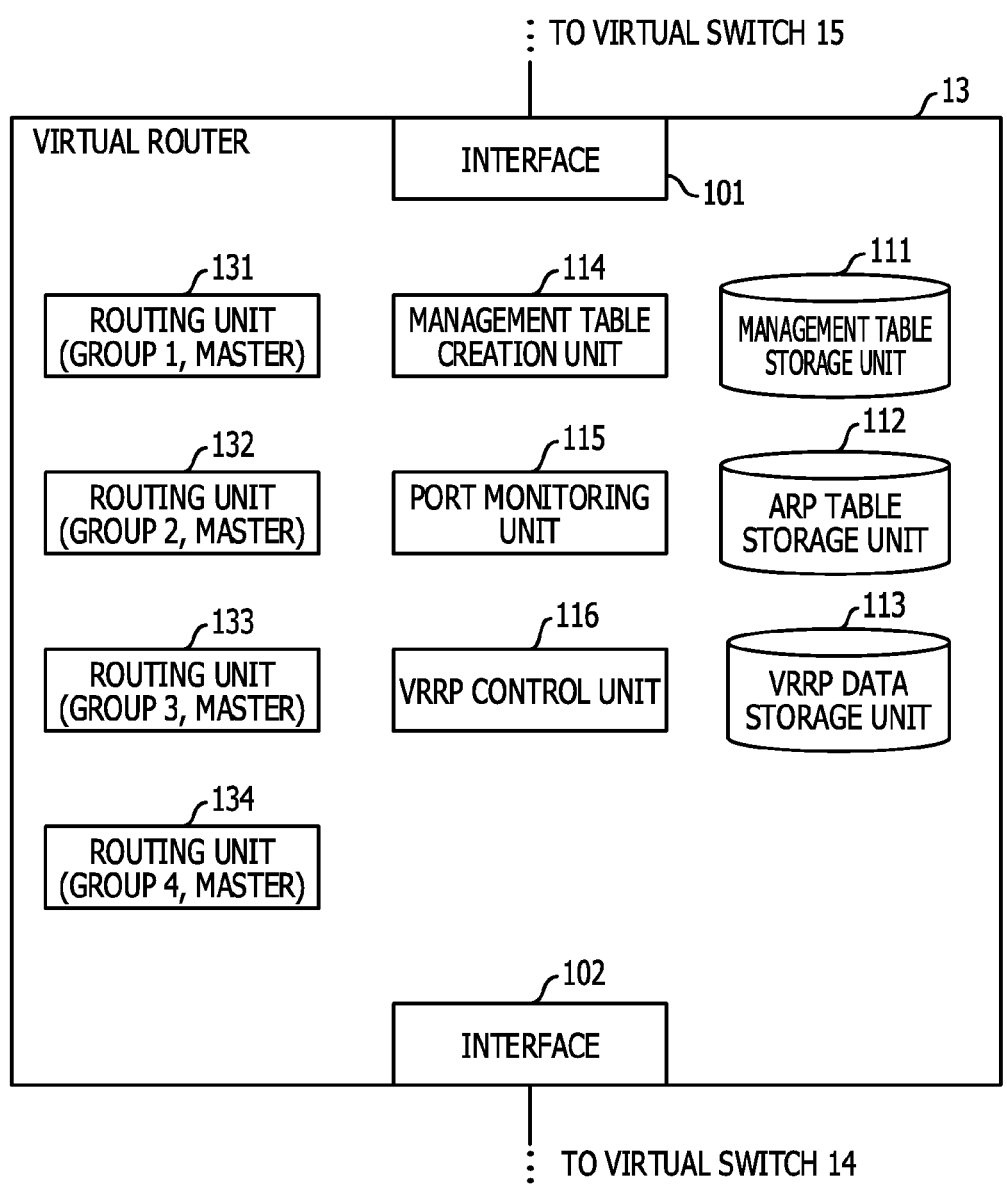
FIG. 2 is a functional block diagram of a virtual router.

FIG. 2 illustrates a functional block diagram of the virtual router 13 in the server 10. The virtual router 13 includes a routing unit 131, a routing unit 132, a routing unit 133, a routing unit 134, a management table storage unit 111, an Address Resolution Protocol (ARP) table storage unit 112, a VRRP data storage unit 113, a management table creation unit 114, a port monitoring unit 115, a VRRP control unit 116, and interfaces 101 and 102 that are virtual ports, for example.

The routing unit 131 relays communication for a VRRP group 1. The routing unit 132 relays communication for a VRRP group 2. The routing unit 133 relays communication for a VRRP group 3. The routing unit 134 relays communication for a VRRP group 4. The routing units 131 to 134 operate as master nodes in the VRRP. The management table creation unit 114 uses data stored in the ARP table storage unit 112, data stored in a Forwarding DataBase (FDB) in the virtual switch 14, and data stored in an FDB of the virtual switch 15 to manage a management table stored in the management table storage unit 111. The port monitoring unit 115 detects a failure in the port 11 and a failure in the port 12. The VRRP control unit 116 manages data stored in the VRRP data storage unit 113, creates a VRRP Advertisement message, and multicasts the created VRRP Advertisement message through the interfaces 101 and 102.

Figure 3:
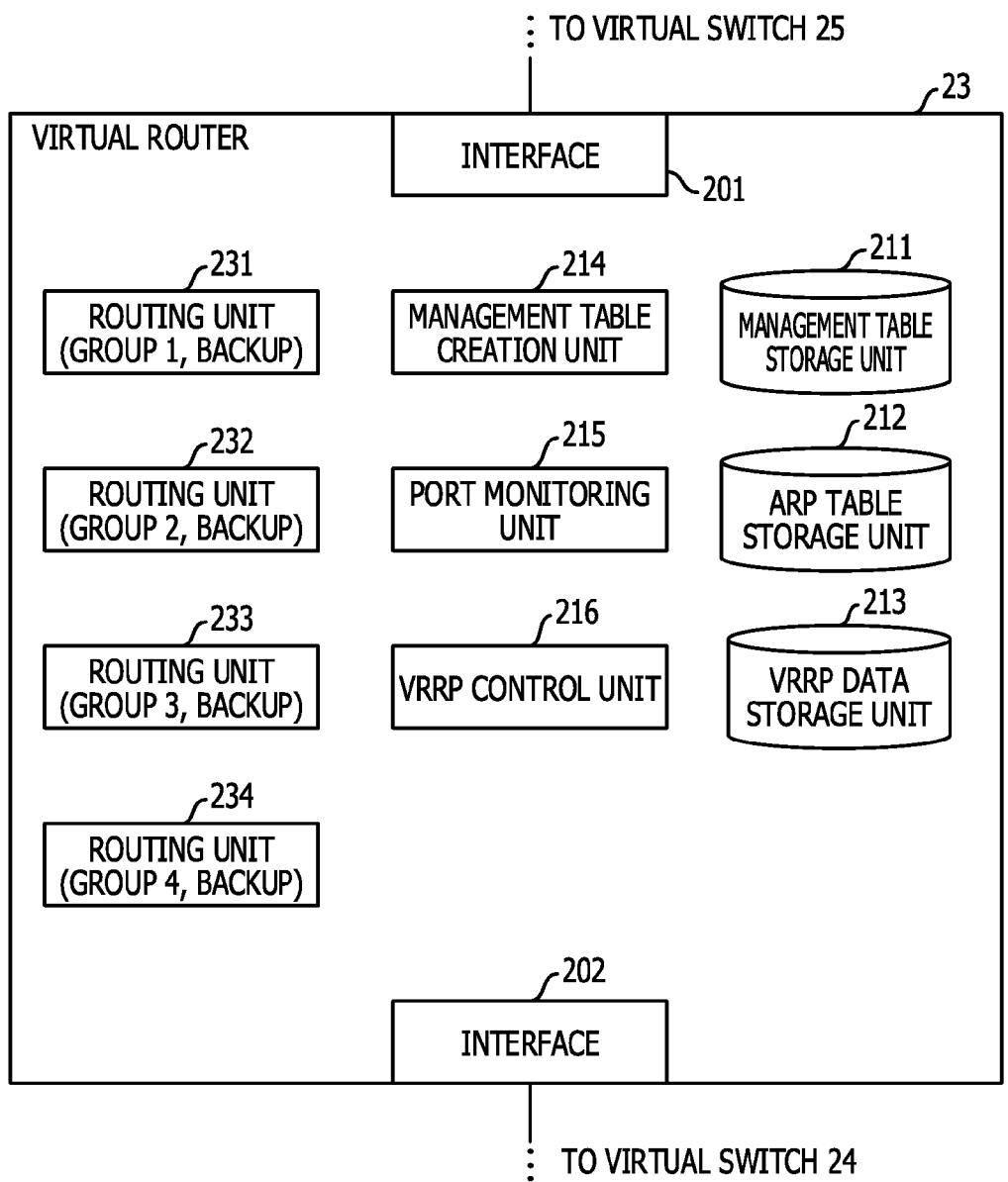
FIG. 3 is a functional block diagram of a virtual router.

FIG. 3 illustrates a functional block diagram of the virtual router 23 in the server 20. The virtual router 23 includes a routing unit 231, a routing unit 232, a routing unit 233, a routing unit 234, a management table storage unit 211, an ARP table storage unit 212, a VRRP data storage unit 213, a management table creation unit 214, a port monitoring unit 215, a VRRP control unit 216, and interfaces 201 and 202 that are virtual ports, for example.

The routing unit 231 relays communication for the VRRP group 1. The routing unit 232 relays communication for the VRRP group 2. The routing unit 233 relays communication for the VRRP group 3. The routing unit 234 relays communication for the VRRP group 4. The routing units 231 to 234 operate as backup nodes in the VRRP. The management table creation unit 214 uses data stored in the ARP table storage unit 212, data stored in an FDB of the virtual switch 24, and data stored in an FDB of the virtual switch 25 to manage a management table stored in the management table storage unit 211. The port monitoring unit 215 detects a failure in the physical port 21 and a failure in the physical port 22. The VRRP control unit 216 manages data stored in the VRRP data storage unit 213, creates a VRRP Advertisement message, and multicasts the created VRRP Advertisement message through the interfaces 201 and 202.

FIG. 4 illustrates communication controlled by each VRRP group. Communication from the virtual machine 100 to the terminal 5 is controlled by the VRRP group 3, communication from the virtual machine 200 to the terminal 5 is controlled by the VRRP group 4, communication from the terminal 5 to the virtual machine 100 is controlled by the VRRP group 1, and communication from the terminal 5 to the virtual machine 200 is controlled by the VRRP group 2.

Figure 5:
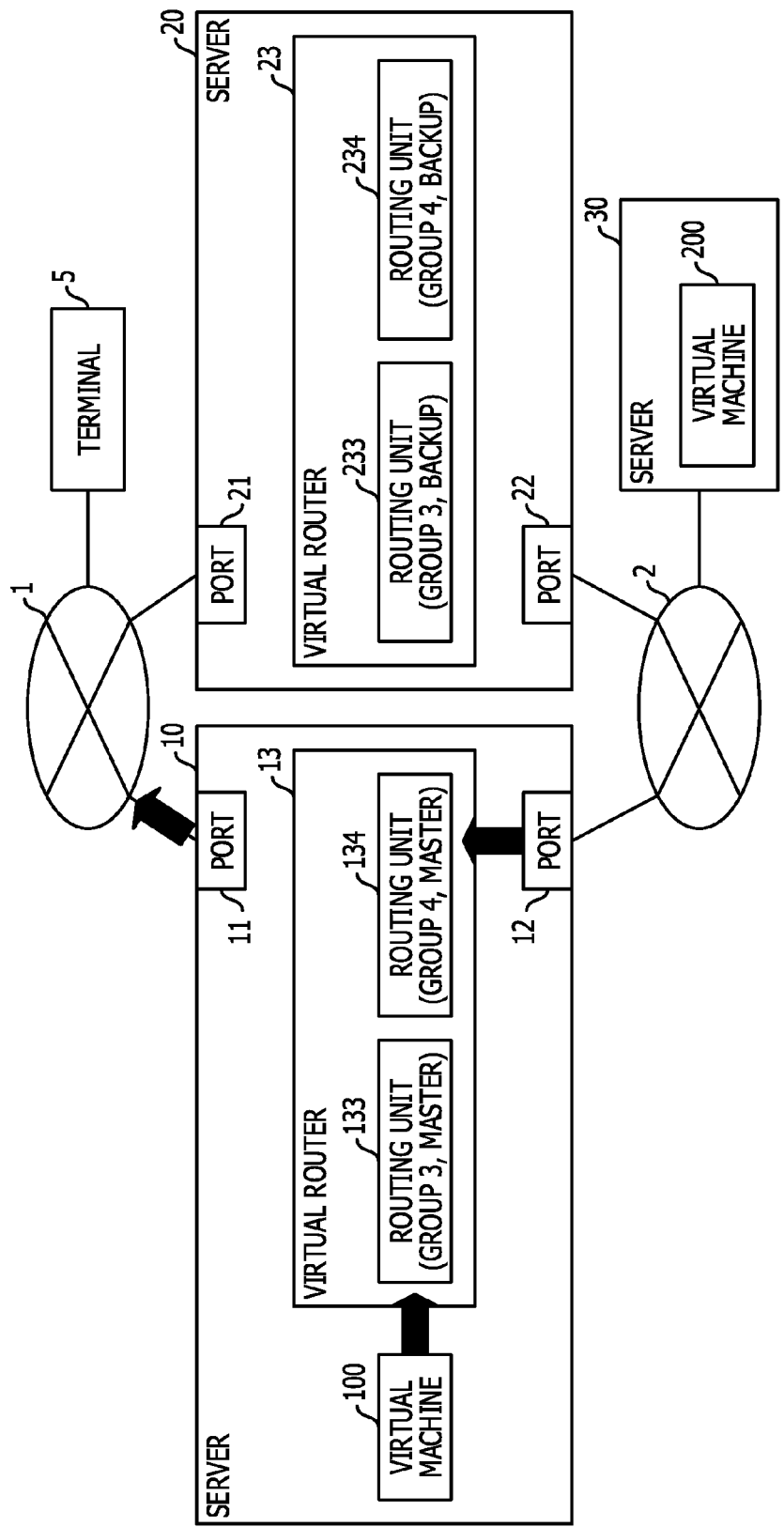
FIG. 5 is a diagram for explaining relay of communication data.
Figure 6:
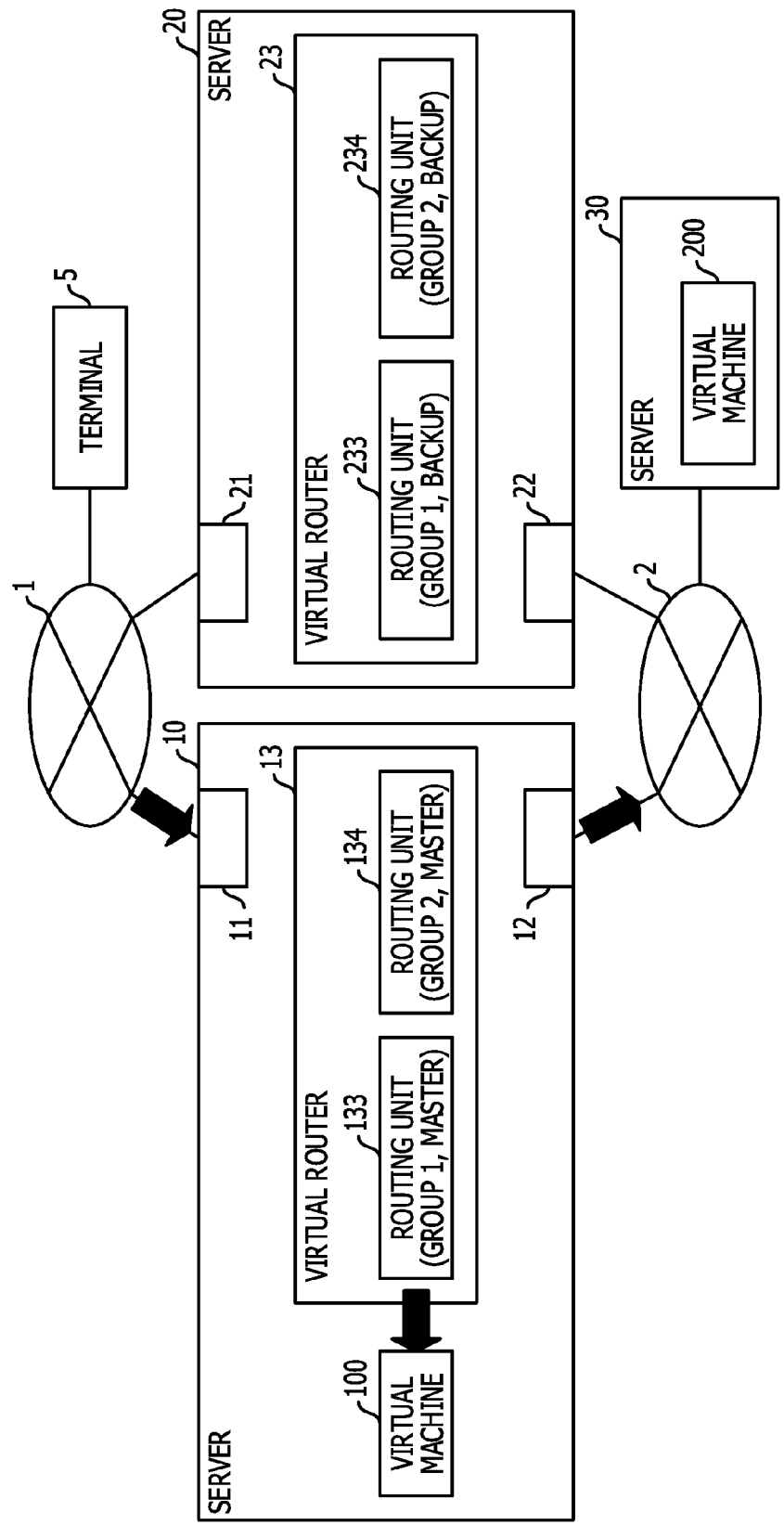
FIG. 6 is a diagram for explaining relay of communication data.

When VRRP settings are configured as illustrated in FIGS. 2 to 4, communication data is relayed as illustrated in FIGS. 5 and 6. Note that, in FIGS. 5 and 6, the insides of the servers 10 and 20 are simplified for ease of explanation.

First, with reference to FIG. 5, description is given of relay of communication data transmitted by the virtual machine 100 and communication data transmitted by the virtual machine 200. In FIG. 5, transfer of communication data is represented by black arrows. The communication data transmitted by the virtual machine 100 is relayed to the port 11 by the virtual router 13, and then transmitted to the network 1 from the port 11. The communication data transmitted to the network 2 by the virtual machine 200 is received by the port 12 in the server 10. Then, the communication data transmitted by the virtual machine 200 is relayed to the port 11 by the virtual router 13, and transmitted to the network 1 from the port 11.

Next, with reference to FIG. 6, description is given of relay of communication data transmitted by the terminal 5. In FIG. 6, transfer of communication data is represented by black arrows. Communication data transmitted to the network 1 by the terminal 5 is received by the port 11 in the server 10. When the received communication data is addressed to the virtual machine 100, the virtual router 13 outputs the communication data to the virtual machine 100 in the server 10. When the received communication data is addressed to the virtual machine 200, the virtual router 13 transmits the communication data to the network 2 from the port 12.

FIGS. 7 and 8 illustrate settings for each group. FIG. 7 illustrates settings for each group in the virtual router 13. For the VRRP group 1, the priority is 100, the virtual IP address is 2.2.2.4, the virtual MAC address is A, and the tracking interface is the interface 102. For the VRRP group 2, the priority is 100, the virtual IP address is 2.2.2.5, the virtual MAC address is B, and the tracking interface is the interface 102. For the VRRP group 3, the priority is 100, the virtual IP address is 1.1.1.3, the virtual MAC address is C, and the tracking interface is the interface 101. For the VRRP group 4, the priority is 100, the virtual IP address is 1.1.1.4, the virtual MAC address is D, and the tracking interface is the interface 101. Note that the tracking interface is an interface that is to be a target of a tracking function in the VRRP.

FIG. 8 illustrates settings for each group in the virtual router 23. For the VRRP group 1, the priority is 99, the virtual IP address is 2.2.2.4, the virtual MAC address is A, and the tracking interface is the interface 202. For the VRRP group 2, the priority is 99, the virtual IP address is 2.2.2.5, the virtual MAC address is B, and the tracking interface is the interface 202. For the VRRP group 3, the priority is 99, the virtual IP address is 1.1.1.3, the virtual MAC address is C, and the tracking interface is the interface 201. For the VRRP group 4, the priority is 99, the virtual IP address is 1.1.1.4, the virtual MAC address is D, and the tracking interface is the interface 201.

Figure 9:
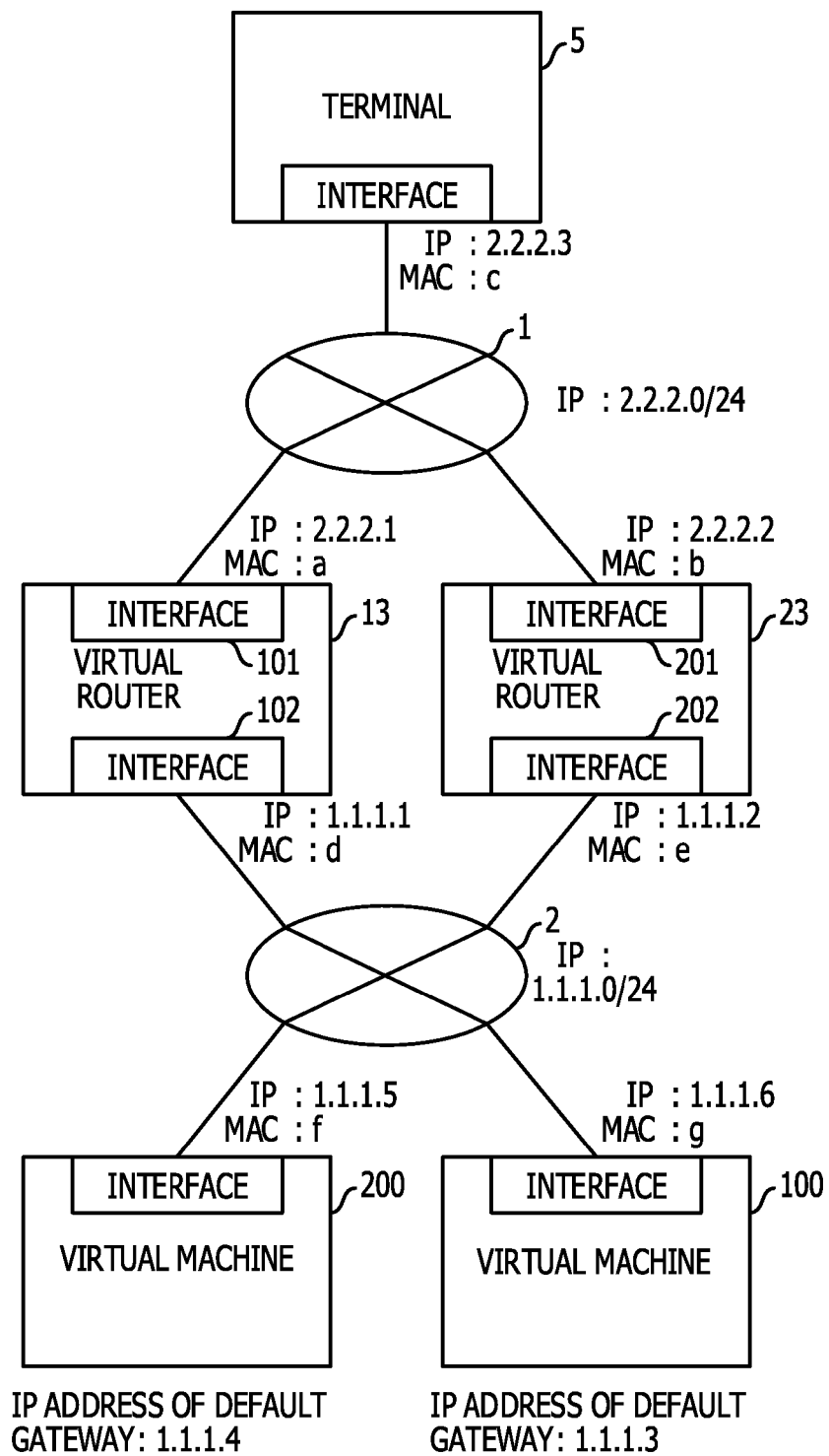
FIG. 9 is a diagram illustrating a logical network of the system according to the embodiment.
Figure 15A:
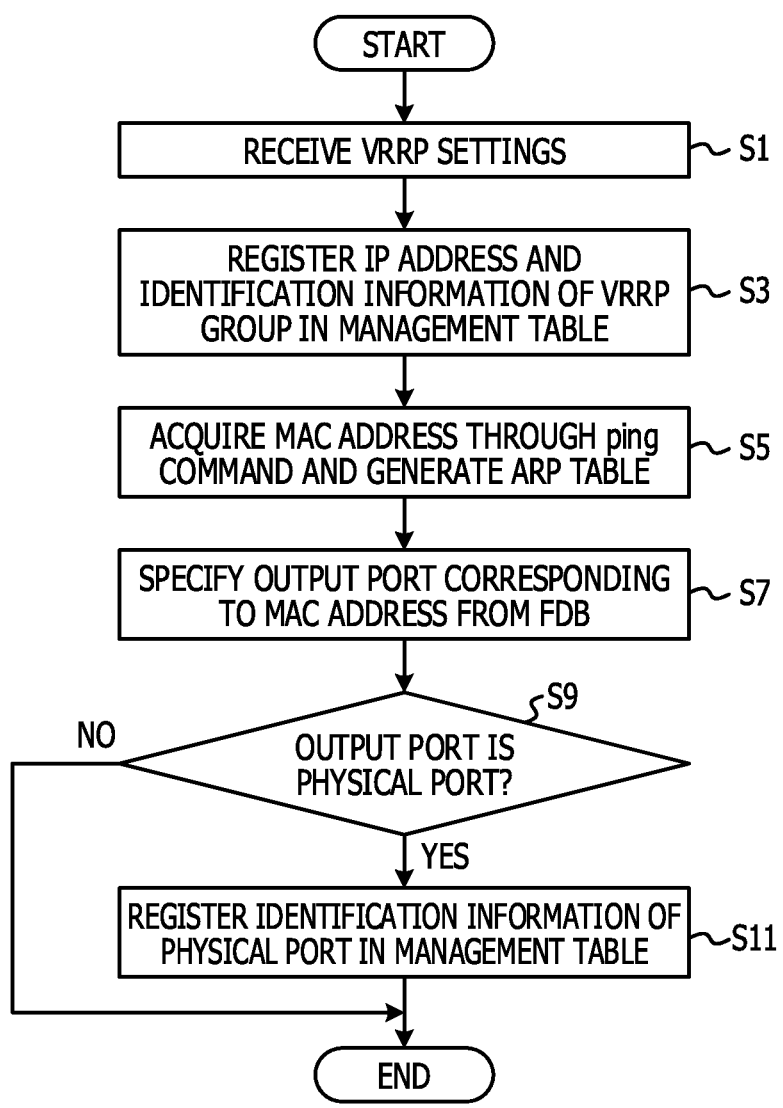
FIG. 15A is a flowchart illustrating a processing flow of generating VRRP settings.

FIG. 9 illustrates a logical network of the system according to this embodiment. The terminal 5, the virtual router 13 and the virtual router 23 are coupled to the network 1. The virtual router 13, the virtual router 23, the virtual machine 100, and the virtual machine 200 are coupled to the network 2. The IP address "2.2.2.3" and the MAC address "c" are assigned to an interface of the terminal 5. The IP address "2.2.2.1" and the MAC address "a" are assigned to the interface 101 of the virtual router 13. The IP address "2.2.2.2" and the MAC address "b" are assigned to the interface 201 of the virtual router 23. The IP address "1.1.1.1" and the MAC address "d" are assigned to the interface 102 of the virtual router 13. The IP address "1.1.1.2" and the MAC address "e" are assigned to the interface 202 of the virtual router 23. The IP address "1.1.1.5" and the MAC address "f" are assigned to an interface of the virtual machine 200. The IP address "1.1.1.6" and the MAC address "g" are assigned to an interface of the virtual machine 100. The IP address of the network 1 is "2.2.2.0/24", and the IP address of the network 2 is "1.1.1.0/24". Also, the IP address of the default gateway of the virtual machine 200 is 1.1.1.4, and the IP address of the default gateway of the virtual machine 100 is 1.1.1.3.

Figure 10:
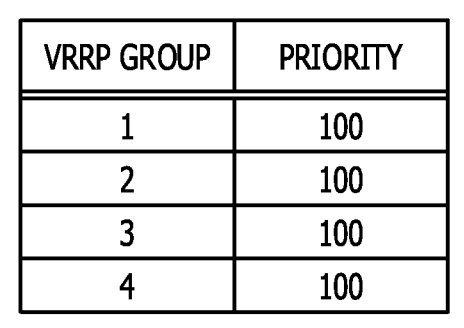
Figure 11:
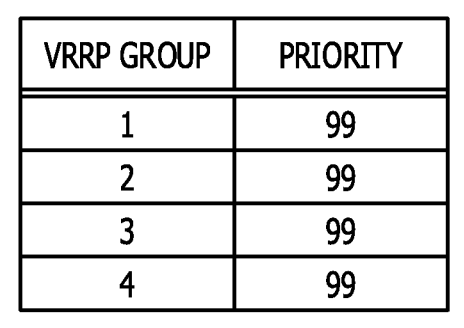

FIG. 10 illustrates an example of data stored in the VRRP data storage unit 113. In the example illustrated in FIG. 10, the identification information and priority of each VRRP group are stored. FIG. 11 illustrates an example of data stored in the VRRP data storage unit 213. In the example illustrated in FIG. 11, the identification information and priority of each VRRP group are stored.

As illustrated in FIGS. 10 and 11, since the priority of the virtual router 13 is higher than that of the virtual router 23 for any of the VRRP groups in an initial state, the virtual router 13 operates as the master node.

Figure 12:
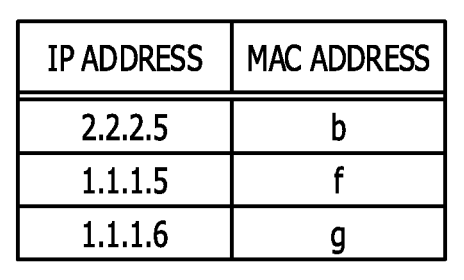

FIG. 12 illustrates an example of an ARP table stored in the ARP table storage unit 112. In the example illustrated in FIG. 12, IP addresses and MAC addresses are stored. Note that the format of data stored in the ARP table storage unit 212 is the same as that of data stored in the ARP table storage unit 112.

FIG. 13 illustrates an example of data stored in the FDB of the virtual switch 15. In the example illustrated in FIG. 13, MAC addresses and identification information of output interfaces are stored. Note that the format of data stored in the FDB of the virtual switch 14, the FDB of the virtual switch 24, and the FDB of the virtual switch 25 is the same as that of the data stored in the FDB of the virtual switch 15.

Figure 14:
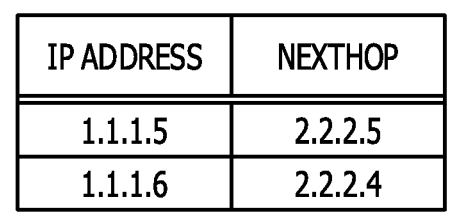

FIG. 14 illustrates settings of routing in the terminal 5. In the example illustrated in FIG. 14, the NextHop IP address is set to 2.2.2.5 when communication data is transmitted to the virtual machine having the IP address of 1.1.1.5, and the NextHop IP address is set to 2.2.2.4 when communication data is transmitted to the virtual machine having the IP address of 1.1.1.6.

Next, with reference to FIGS. 15A to 21, description is given of processing performed in the system according to this embodiment. First, with reference to FIGS. 15A and 18, description is given of processing for configuring VRRP settings, which is executed by the virtual routers 13 and 23. Here, the description is given using processing executed by the virtual router 13 as an example. However, processing executed by the virtual router 23 is also the same.

First, the VRRP control unit 116 in the virtual router 13 receives VRRP setting contents through a command input and the like by an administrator. Based on the received setting contents, the VRRP control unit 116 performs VRRP setting (FIG. 15A: Step S1).

In Step S1, setting of a virtual IP address of the VRRP, association between each VRRP group and virtual machine, and the like are performed. For the VRRP groups 1 and 2, NextHop IP addresses when transmitting communication data from the terminal 5 to the virtual machine are set. Here, for the VRRP group 1, the virtual IP address is 2.2.2.4, which is a NextHop IP address when transmitting communication data to the virtual machine 100 having the IP address of 1.1.1.6. For the VRRP group 2, the virtual IP address is 2.2.2.5, which is a NextHop IP address when transmitting communication data to the virtual machine 200 having the IP address of 1.1.1.5. For the VRRP groups 3 and 4, the IP addresses of the default gateways of the virtual machines are set. Here, for the VRRP group 3, the virtual IP address is 1.1.1.3, which is the IP address of the default gateway of the virtual machine 100. For the VRRP group 4, the virtual IP address is 1.1.1.4, which is the IP address of the default gateway of the virtual machine 200.

The association between the VRRP groups and the virtual machines is performed when there is a virtual machine ahead of the interface designated as the tracking interface. For the VRRP groups 1 and 2, the association is performed since there is a virtual machine ahead of the interface 102 designated as the tracking interface. Here, the VRRP group 1 is associated with the IP address 1.1.1.6 of the virtual machine 100, and the VRRP group 2 is associated with the IP address 1.1.1.5 of the virtual machine 200. For the VRRP groups 3 and 4, there is no virtual machine ahead of the interface 101 designated as the tracking interface. Therefore, the VRRP groups 3 and 4 are associated with the IP address of the correspondent node of the VRRP. The correspondent node of the virtual router 13 is the virtual router 23, and a correspondent node of the virtual router 23 is the virtual router 13. Thus, the IP address 2.2.2.2 is set for the VRRP groups 3 and 4 in the virtual router 13.

The management table creation unit 114 registers the IP address and identification information of the VRRP group in the management table in the management table storage unit 111 (Step S3). Note that the processing from Step S3 to Step S11 is performed for each VRRP group when there is more than one VRRP group to be processed.

In Step S3, the identification information of the associated VRRP groups and the IP address of the virtual machine or the IP address of the correspondent node are registered. FIG. 15B illustrates an example of a management table stored in the management table storage unit 111. In the example illustrated in FIG. 15B, identification information of a port, identification information of a VRRP group influenced by a failure in the port, and the IP address of a virtual machine associated with the VRRP group or the IP address of a correspondent node are stored. In Step S3, the identification information of the port is not stored. Note that the format of data in the management table stored in the management table storage unit 211 is the same as that of data in the management table stored in the management table storage unit 111.

The management table creation unit 114 acquires a MAC address through a Packet INternet Groper (ping) command including an IP address, and creates an ARP table (Step S5).

The management table creation unit 114 specifies an output port corresponding to the MAC address acquired in Step S5 from the FDB of the virtual switch 14 (Step S7).

The management table creation unit 114 determines whether or not the output port specified in Step S7 is the port 11 or the port 12, that is, the physical port (Step S9). If the output port is not the port 11 or the port 12 (Step S9: No route), the processing is terminated. On the other hand, if the output port is the port 11 or the port 12 (Step S9: Yes route), the management table creation unit 114 registers identification information of the port in the management table storage unit 111 (Step S11). Then, the processing is terminated. Note that, in Step S11, the identification information of the ports in the management table illustrated in FIG. 15B is registered.

Initial setting of the VRRP is completed by executing the above processing in the virtual routers 13 and 23. Also, the above processing enables a VRRP group influenced by a failure in the port 11 or the port 12 to be quickly specified when a failure has occurred.

FIG. 16 illustrates the server 10 after completion of the VRRP initial setting. Note that the inside of the server 10 is simplified to facilitate visualization of FIG. 16. FIG. 16 illustrates the ARP table in the ARP table storage unit 112, the FDB of the virtual switch 15, the VRRP data storage unit 113, the management table in the management table storage unit 111, and the FDB of the virtual switch 14. All the routing units 131 to 134 operate as the master nodes.

Figure 17:
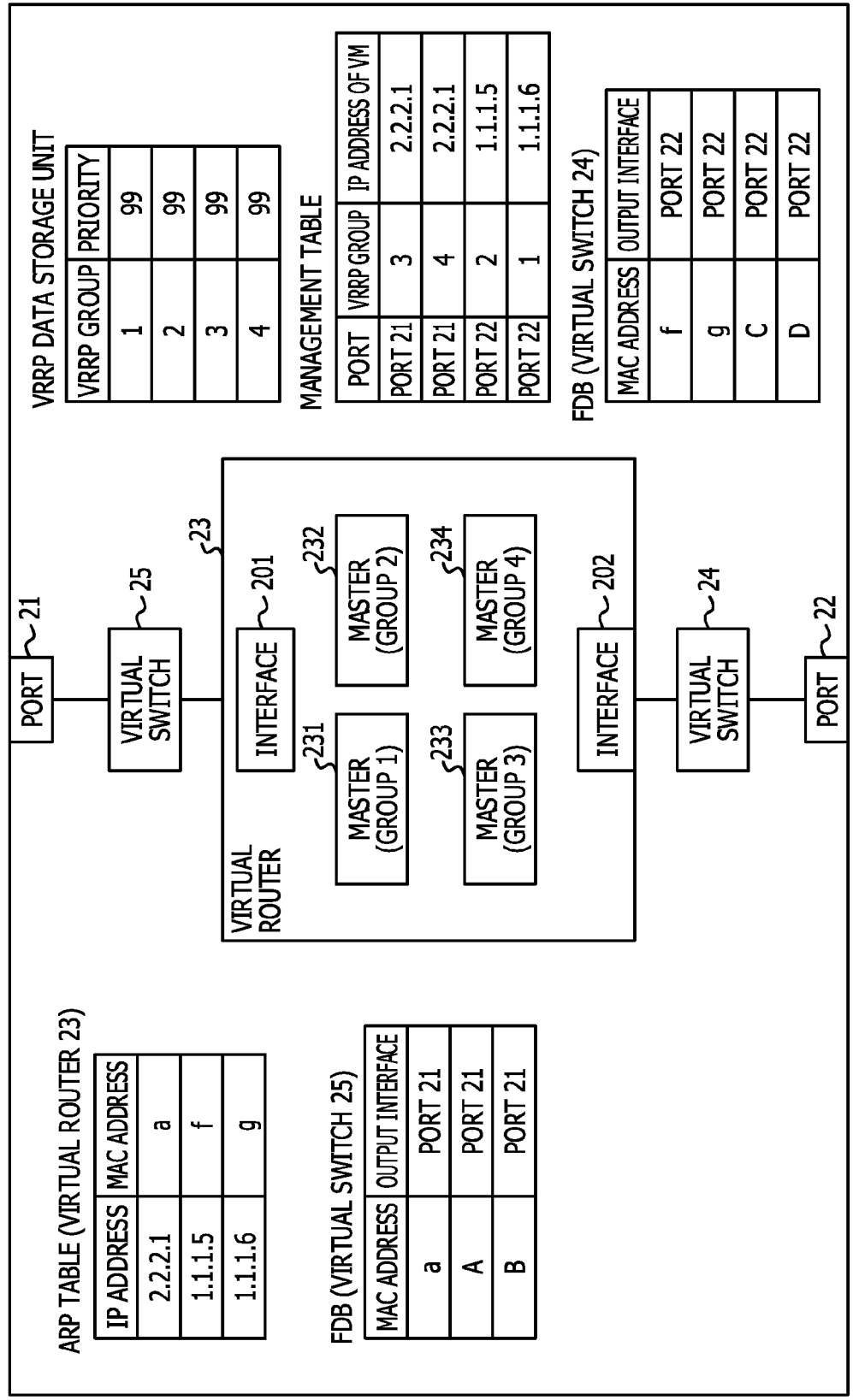
FIG. 17 is a diagram illustrating a virtual router after completion of initial setting of the VRRP.

FIG. 17 illustrates the server 20 after completion of the VRRP initial setting. Note that the inside of the server 20 is simplified to facilitate visualization of FIG. 17. FIG. 17 illustrates the ARP table in the ARP table storage unit 212, the FDB of the virtual switch 25, the VRRP data storage unit 213, the management table in the management table storage unit 211, and the FDB of the virtual switch 24. All the routing units 231 to 234 operate as the backup nodes.

Figure 18:
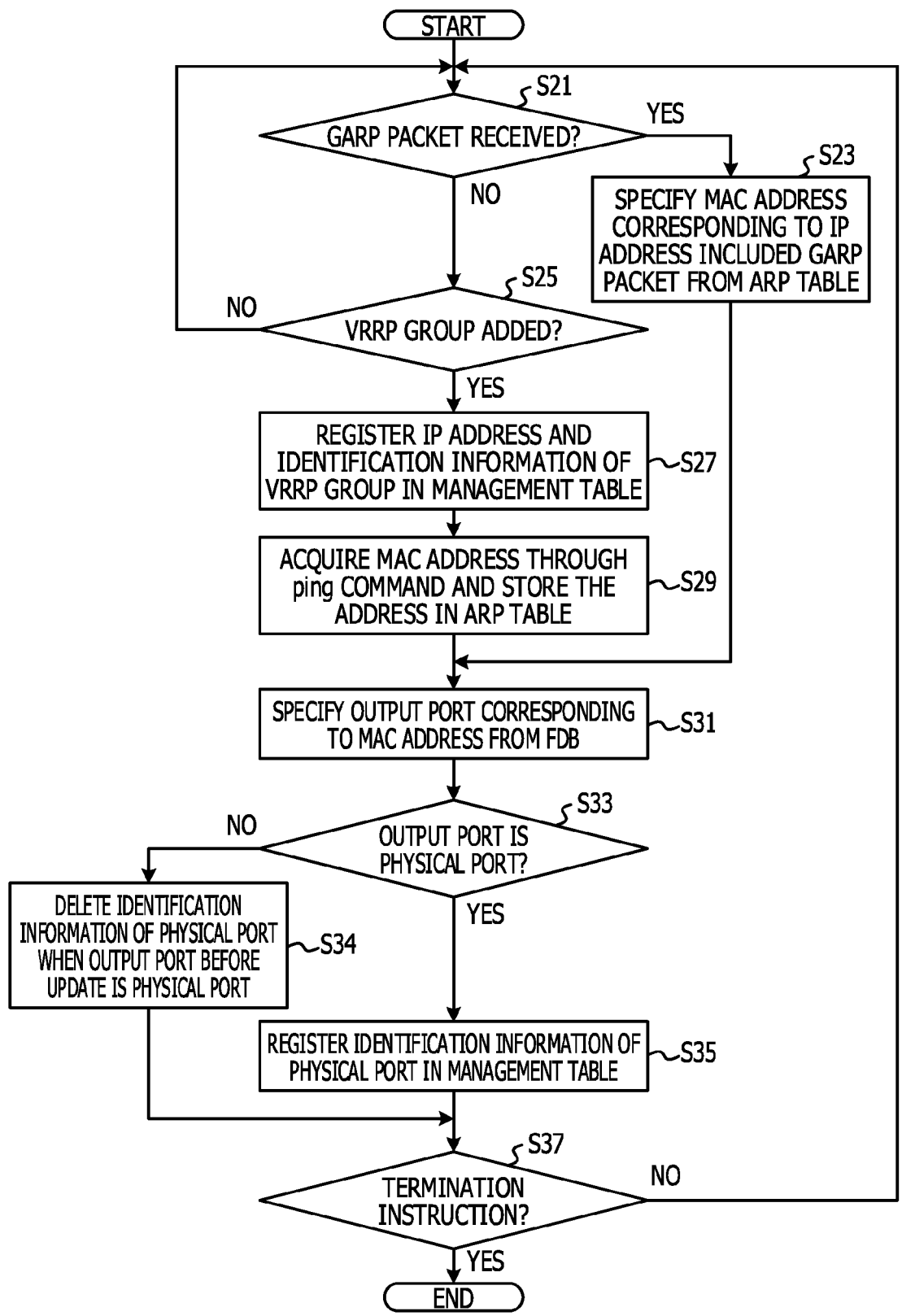
FIG. 18 is a flowchart illustrating a processing flow of adding and updating the VRRP settings.

Next, with reference to FIG. 18, description is given of processing of adding and updating the VRRP settings. This processing is carried out after execution of the processing described with reference to FIGS. 15A and 15B.

First, the management table creation unit 114 determines whether or not a GARP packet is received (FIG. 18: Step S21). If the GARP packet is received (Step S21: Yes route), the management table creation unit 114 executes processing from Step S23 to update the VRRP settings. First, the management table creation unit 114 specifies a MAC address corresponding to a source IP address included in the GARP packet from the ARP table stored in the ARP table storage unit 112 (Step S23). Then, the processing moves to Step S31.

On the other hand, when no GARP packet is received (Step S21: No route), the management table creation unit 114 determines whether or not there is an instruction to add a VRRP group (Step S25).

If there is no instruction to add a VRRP group (Step S25: No route), the processing returns to Step S21. On the other hand, if there is an instruction to add a VRRP group (Step S25: Yes route), the management table creation unit 114 executes processing from Step S27 to add VRRP settings. More specifically, the management table creation unit 114 registers the IP address and identification information of a VRRP group, which are included in the addition instruction, in the management table in the management table storage unit 111 (Step S27).

The management table creation unit 114 acquires a MAC address through a ping command including the IP address included in the addition instruction, and stores the acquired MAC address in the ARP table storage unit 112 (Step S29).

The management table creation unit 114 specifies an output port corresponding to the MAC address specified in Step S23 or the MAC address acquired in Step S29 from the FDB of the virtual switch 14 (Step S31).

The management table creation unit 114 determines whether or not the output port specified in Step S31 is the port 11 or the port 12, that is, the physical port (Step S33). If the output port is not the port 11 or the port 12 (Step S33: No route), the management table creation unit 114 determines whether or not the output port before update is the physical port. If the output port before update is the physical port, the management table creation unit 114 deletes identification information of the physical port (Step S34), and moves to processing in Step S37. Note that the processing in Step S34 is performed when the Yes route is taken in Step S21 and is not performed when the No route is taken in Step S21. The processing in Step S34 is performed so that the settings before update do not remain in the management table. On the other hand, if the output port is the port 11 or the port 12 (Step S33: Yes route), the management table creation unit 114 registers identification information of the port in the management table storage unit 111 (Step S35). Note that, when the processing in Step S35 is performed, the identification information of the ports in the management table illustrated in FIG. 15B is registered.

The management table creation unit 114 determines whether or not there is a termination instruction from the administrator (Step S37). If there is no termination instruction (Step S37: No route), the processing returns to Step S21 to continue the processing. On the other hand, if there is a termination instruction (Step S37: Yes route), the processing is terminated.

The execution of the processing as described above makes it possible to respond to a change, if any, in the VRRP settings.

Figure 19:
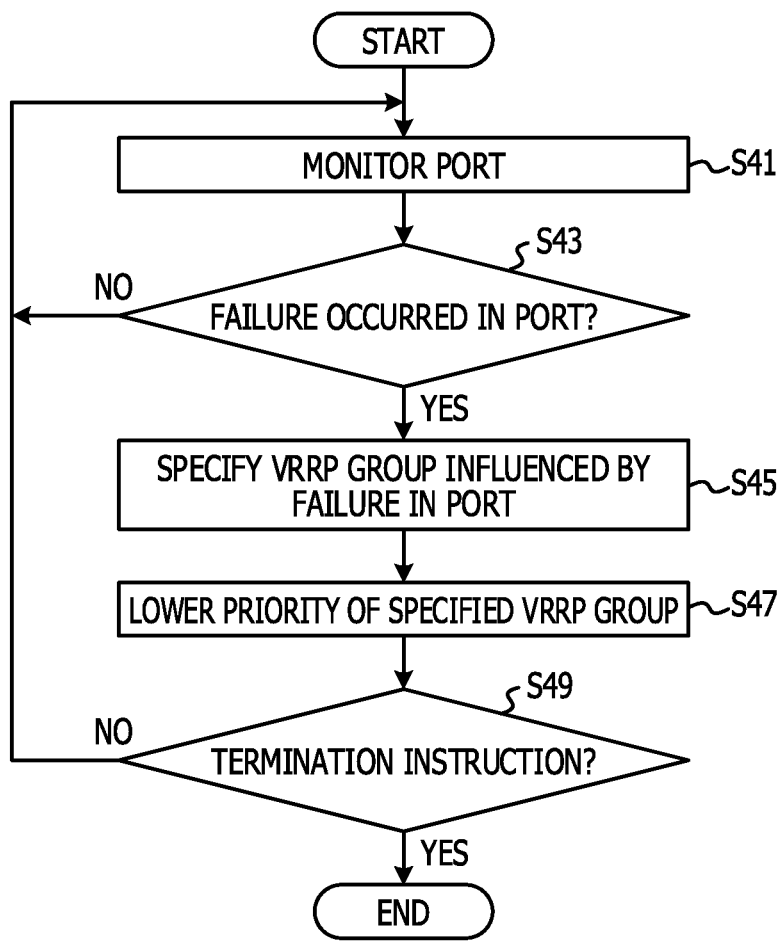
FIG. 19 is a flowchart illustrating a processing flow of dealing with a failure occurring in a port.
Figure 20:
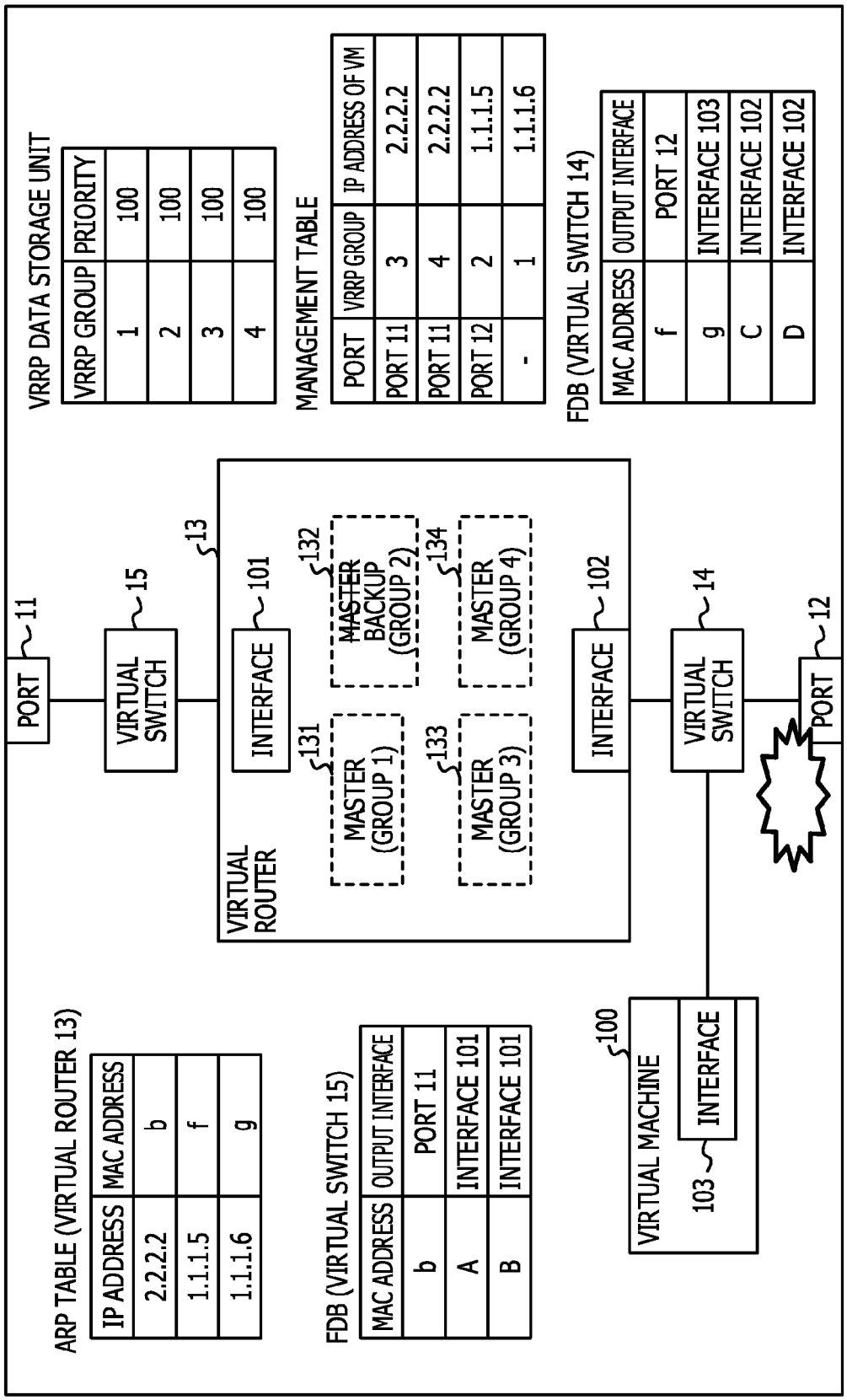
FIG. 20 is a diagram illustrating a virtual router after the occurrence of failure in the port.
Figure 21:
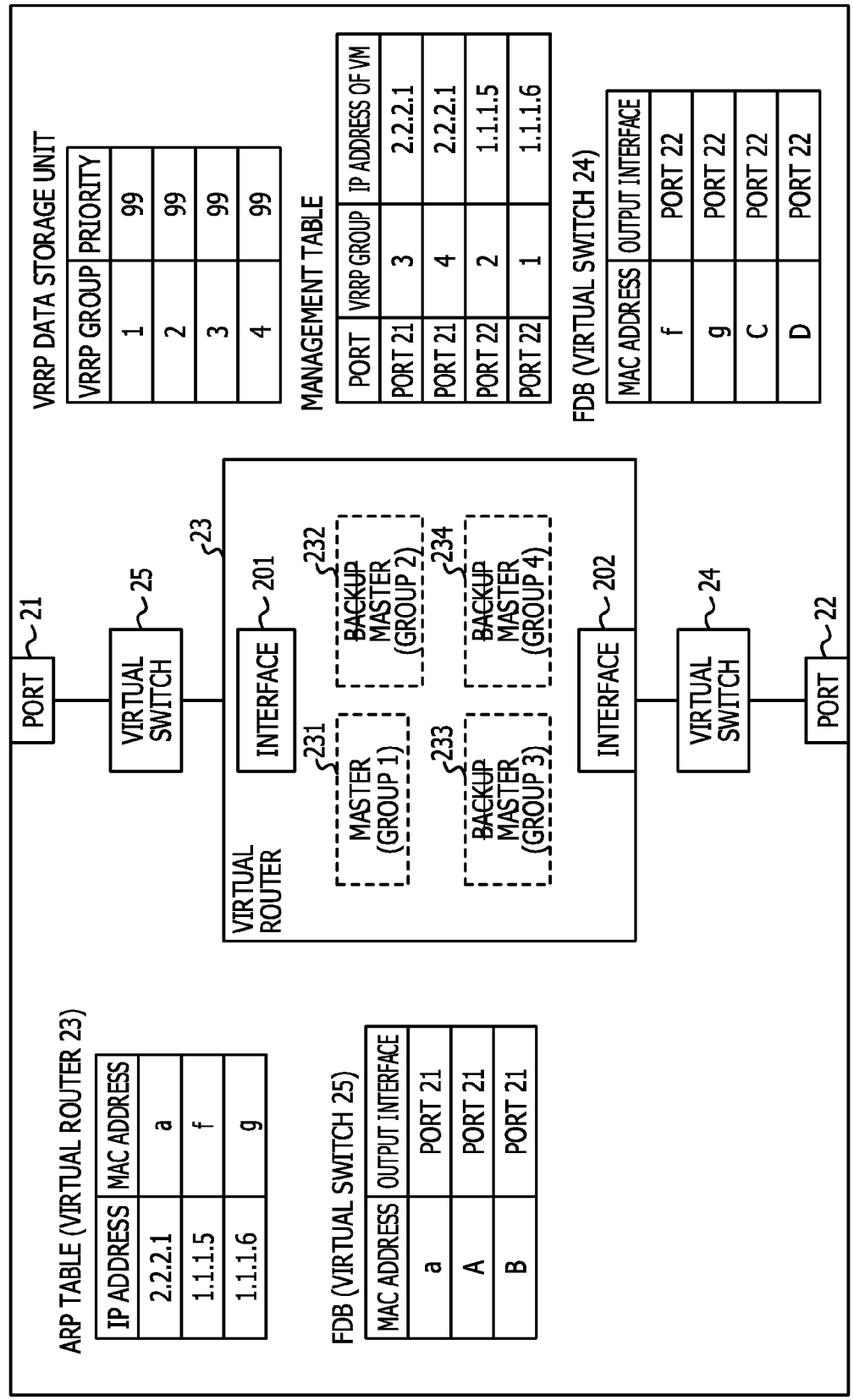
FIG. 21 is a diagram illustrating a virtual router after the occurrence of failure in the port.

Next, with reference to FIGS. 19 to 21, description is given of processing for dealing with a failure that has occurred in a port. Here, the description is given by using, as an example, processing executed by the virtual router 13. However, processing executed by the virtual router 23 is also the same.

First, the port monitoring unit 115 monitors the ports 11 and 12 (FIG. 19: Step S41). The port monitoring unit 115 monitors the ports 11 and 12 with a log collected by syslog, for example.

The port monitoring unit 115 determines whether or not a failure has occurred in the port 11 or the port 12 (Step S43). If no failure has occurred in any of the ports 11 and 12 (Step S43: No route), the processing returns to Step S41. On the other hand, if a failure has occurred in the port 11 or the port 12 (Step S43: Yes route), the port monitoring unit 115 outputs the identification information of the port with the failure to the VRRP control unit 116.

In response, the VRRP control unit 116 specifies identification information of a VRRP group influenced by the failure in the port (Step S45). To be more specific, the VRRP control unit 116 specifies, from the management table storage unit 111, identification information of a VRRP group corresponding to the identification information of the port received from the port monitoring unit 115.

The VRRP control unit 116 lowers the priority corresponding to the identification information of the specified VRRP group by a predetermined value in the VRRP data storage unit 113 (Step S47). In this embodiment, the predetermined value is 2.

The VRRP control unit 116 determines whether or not there is a termination instruction from the administrator (Step S49). If there is no termination instruction (Step S49: No route), the processing returns to Step S41 to continue the processing. On the other hand, if there is a termination instruction (Step S49: Yes route), the processing is terminated.

The execution of the processing as described above enables the virtual router 23 in the server 20 with no failure to operate as the master node, thus enabling continued communication between the virtual machine and the terminal 5.

FIG. 20 illustrates the server 10 after the occurrence of the failure in the port 12. Note that the inside of the server 10 is simplified to facilitate visualization of FIG. 20. FIG. 20 illustrates the ARP table in the ARP table storage unit 112, the FDB of the virtual switch 15, the VRRP data storage unit 113, the management table in the management table storage unit 111, and the FDB of the virtual switch 14. The routing units 131, 133, and 134 operate as the master nodes, while the routing unit 132 operates as the backup node.

The routing unit 132 is switched from the master node to the backup node. This is because the virtual router 13 has detected through the VRRP Advertisement message from the virtual router 23 that the priority of the VRRP group 2 in the virtual router 13 is lower than that of the VRRP group 2 in the virtual router 23.

Moreover, there is a change in the contents of the FDB in the virtual switch 15. To be more specific, a virtual MAC address A, that is, communication data addressed to the VRRP group 1 and a virtual MAC address B, that is, communication data addressed to the VRRP group 2 are outputted not to the virtual router 13 but to the port 11 from the virtual switch 15. Also, the MAC address f, that is, an entry for the virtual machine 200 has disappeared from entries in the virtual switch 14.

FIG. 21 illustrates the server 20 after the occurrence of the failure in the port 12. Note that the inside of the server 20 is simplified to facilitate visualization of FIG. 21. FIG. 21 illustrates the ARP table in the ARP table storage unit 212, the FDB of the virtual switch 25, the VRRP data storage unit 213, the management table in the management table storage unit 211, and the FDB of the virtual switch 24. The routing unit 231 operates as the backup node, while the routing units 232 to 234 operate as the master nodes.

The routing unit 232 is switched from the backup node to the master node. This is because the virtual router 23 has detected through the VRRP Advertisement message from the virtual router 13 that the priority of the VRRP group 2 in the virtual router 23 is higher than that of the VRRP group 2 in the virtual router 13.

For the VRRP group 3, both of the routing units 133 and 233 are the master nodes. For the VRRP group 4, both of the routing units 134 and 234 are the master nodes. As illustrated in FIG. 4, since the communication in a direction from the virtual machine to the terminal is processed for the VRRP groups 3 and 4, the virtual router 23 receives and processes the VRRP Advertisement message from the port 22. However, since there is a failure in the port 12, no VRRP Advertisement message is transmitted from the port 12, and the virtual router 23 can receive no VRRP Advertisement message from the port 22. Thus, the routing units 233 and 234 in the virtual router 23 are switched from the backup nodes to the master nodes when the time for which no VRRP Advertisement message is received exceeds a predetermined time. Moreover, since a failure has occurred in the port 12, the virtual router 13 can receive no VRRP Advertisement message from the port 12. Accordingly, the routing units 133 and 134 remain as the master nodes.

Moreover, there is a change in the contents of the FDB in the virtual switch 25. To be more specific, the virtual MAC address B, that is, communication data addressed to the VRRP group 2 is outputted not to the port 21 but to the virtual router 23 from the virtual switch 25. Also, the MAC address g, that is, an entry for the virtual machine 100 has disappeared from entries in the virtual switch 24.

Although an embodiment of the present disclosure has been described above, the present disclosure is not limited thereto. For example, the configuration of functional blocks in the servers 10, 20, and 30 and the virtual routers 13 and 23 described above may not coincide with an actual program module configuration.

Also, the configuration of each of the tables described above is an example, and the present disclosure is not limited thereto. Moreover, as to the processing flow, the order of the processing may be shuffled unless the processing result is changed. Furthermore, the processing may be executed in parallel.

Moreover, although the above description is given of the example of two virtual machines, there may be three or more virtual machines.

Figure 22:
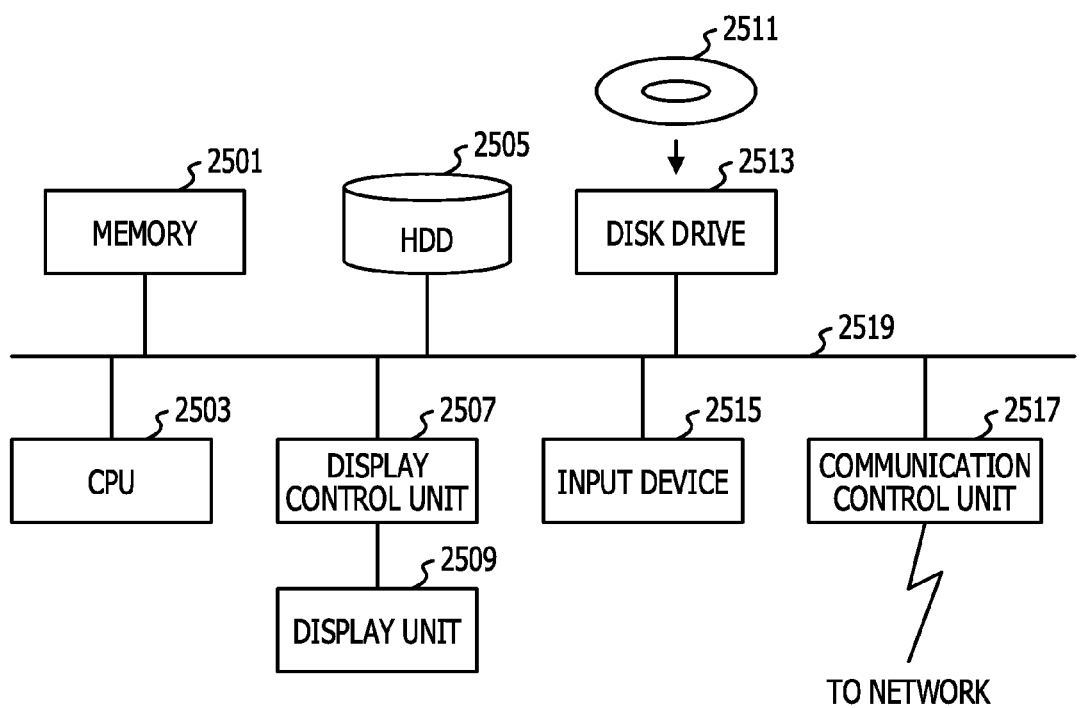
FIG. 22 is a functional block diagram of a computer.

Note that the servers 10 to 30 and the terminal 5 described above are computer devices, in which as illustrated in FIG. 22, a memory 2501, a central processing unit (CPU) 2503, a Hard Disk Drive (HDD) 2505, a display control unit 2507 coupled to a display unit 2509, a drive unit 2513 for a removable disk 2511, an input unit 2515, and a communication control unit 2517 for coupling to a network are coupled to each other through a bus 2519. An Operating System (OS) and an application program for carrying out the processing in this example are stored in the HDD 2505, and are read into the memory 2501 from the HDD 2505 when executed by the CPU 2503. The CPU 2503 controls the display control unit 2507, the communication control unit 2517, and the drive unit 2513 according to processing contents of the application program to perform predetermined operations. Also, data that is being processed is mostly stored in the memory 2501, but may be stored in the HDD 2505. In the example of the present disclosure, the application program for carrying out the processing described above is stored in the computer-readable removable disk 2511 for distribution and is installed into the HDD 2505 from the drive unit 2513. Alternatively, the application program may be installed into the HDD 2505 through a network such as the Internet and the communication control unit 2517. In such a computer device, various functions as described above are realized by organized cooperation between the hardware such as the CPU 2503 and the memory 2501 and the programs such as the OS and the application program described above.

Next, a technology related to this embodiment is described.

Figure 23:
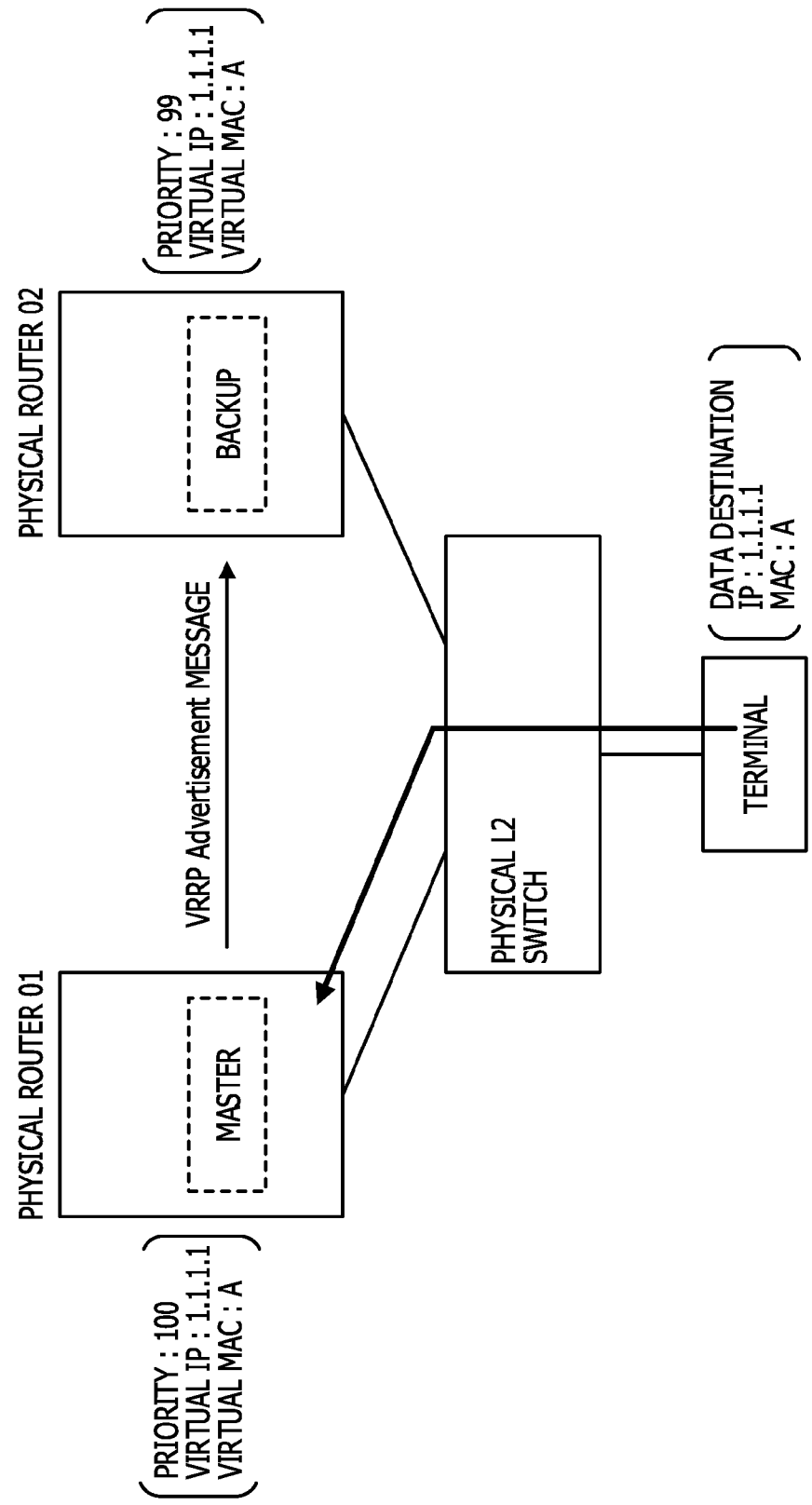
FIG. 23 is a diagram for explaining redundancy of a physical router by the VRRP.

With reference to FIG. 23, description is given of redundancy of a physical router by the VRRP. In FIG. 23, a physical router 01 and a physical router 02 are controlled by the VRRP. The physical router 01 is a master node and thus periodically transmits a VRRP Advertisement message to the physical router 02 that is a backup node. The physical router 01 operates as the master node since the priority (100 in the example illustrated in FIG. 23) included in the VRRP Advertisement message is higher than that of the physical router 02. Note that the VRRP Advertisement message is multicast-transmitted to a node belonging to the same VRRP group.

In FIG. 23, a physical L2 (Layer2) switch transfers a packet transmitted by the terminal to the physical router 01 that operates as the master node. The physical router 01 performs routing of the received packet. A virtual IP address and a virtual MAC address are assigned to each VRRP group. Assuming that, in the packet transmitted by the terminal, a destination IP address is the virtual IP address and a destination MAC address is the virtual MAC address, the transmitted packet is transferred to the physical router 01 that is the master node.

Figure 24:
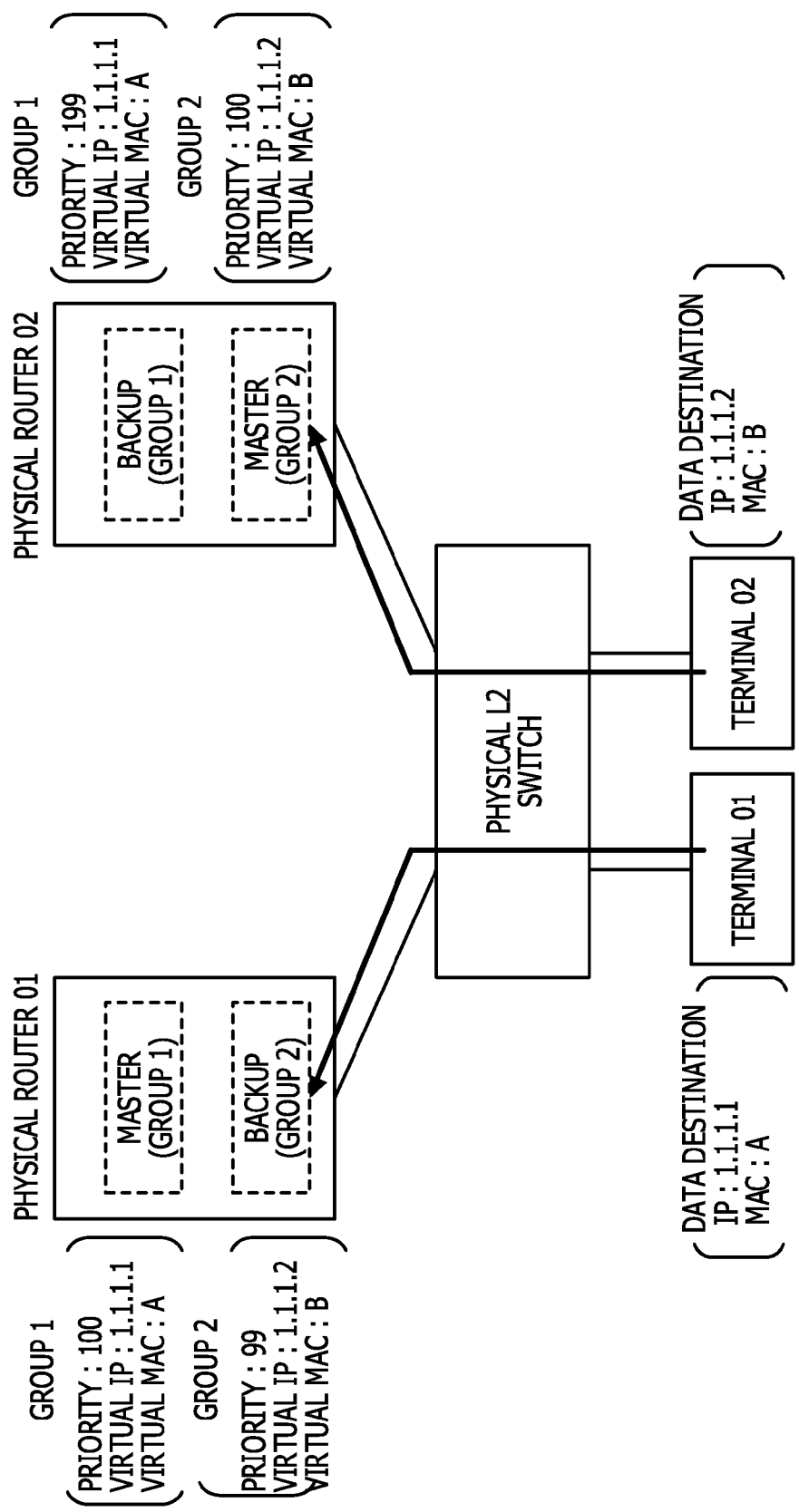
FIG. 24 is a diagram illustrating an example of setting multiple VRRP groups.

FIG. 24 illustrates an example of setting multiple VRRP groups. In FIG. 24, two VRRP groups (the VRRP group 1 and the VRRP group 2) are set for the physical router 01 and the physical router 02. The physical router 01 is the master node for the VRRP group 1, while the physical router 02 is the master node for the VRRP group 2.

A terminal 01 and a terminal 02 are coupled to the physical L2 switch. The terminal 01 transmits to the physical L2 switch a packet in which a virtual IP address of the VRRP group 1 is a destination IP address and a virtual MAC address of the VRRP group 1 is a destination MAC address. The physical L2 switch transmits the received packet to the physical router 01 that is the master node of the VRRP group 1. Meanwhile, the terminal 02 transmits to the physical L2 switch a packet in which a virtual IP address of the VRRP group 2 is a destination IP address and a virtual MAC address of the VRRP group 2 is a destination MAC address. The physical L2 switch transmits the received packet to the physical router 02 that is the master node of the VRRP group 2.

Figure 25:
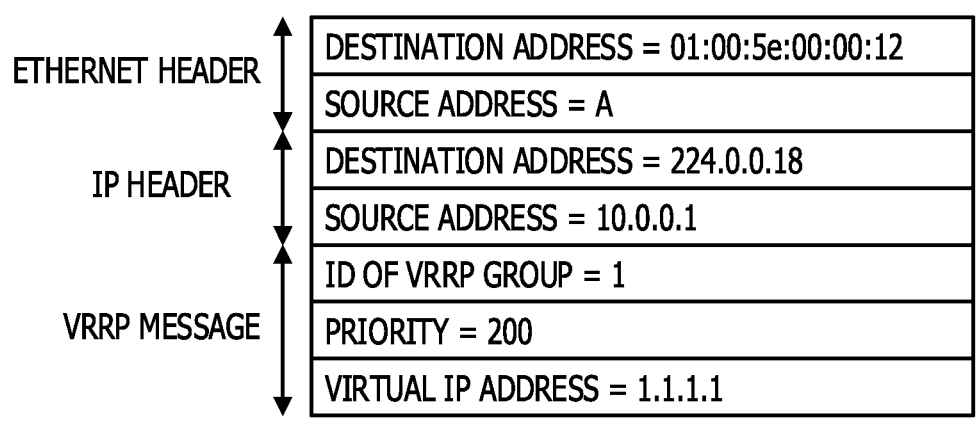
FIG. 25 is a diagram illustrating an example of a VRRP Advertisement message.

FIG. 25 illustrates an example of the VRRP Advertisement message. In the example illustrated in FIG. 25, an Ethernet (registered trademark) header includes a destination address, that is, a destination MAC address here, and a source address, that is, a source MAC address here. A multicast address for VRRP is set as the destination MAC address, while a virtual MAC address of a VRRP group to which the source physical router belongs is set as the source MAC address. An IP header includes a destination address, that is, a destination IP address here, and a source address, that is, a source IP address here. A multicast address for VRRP is set as the destination IP address, while an IP address of an interface of a source physical router, for example, of a physical port is set as the source IP address. The VRRP message includes a router ID, that is, an ID of a VRRP group here, a priority, and a virtual IP address of the VRRP group.

Figure 26:
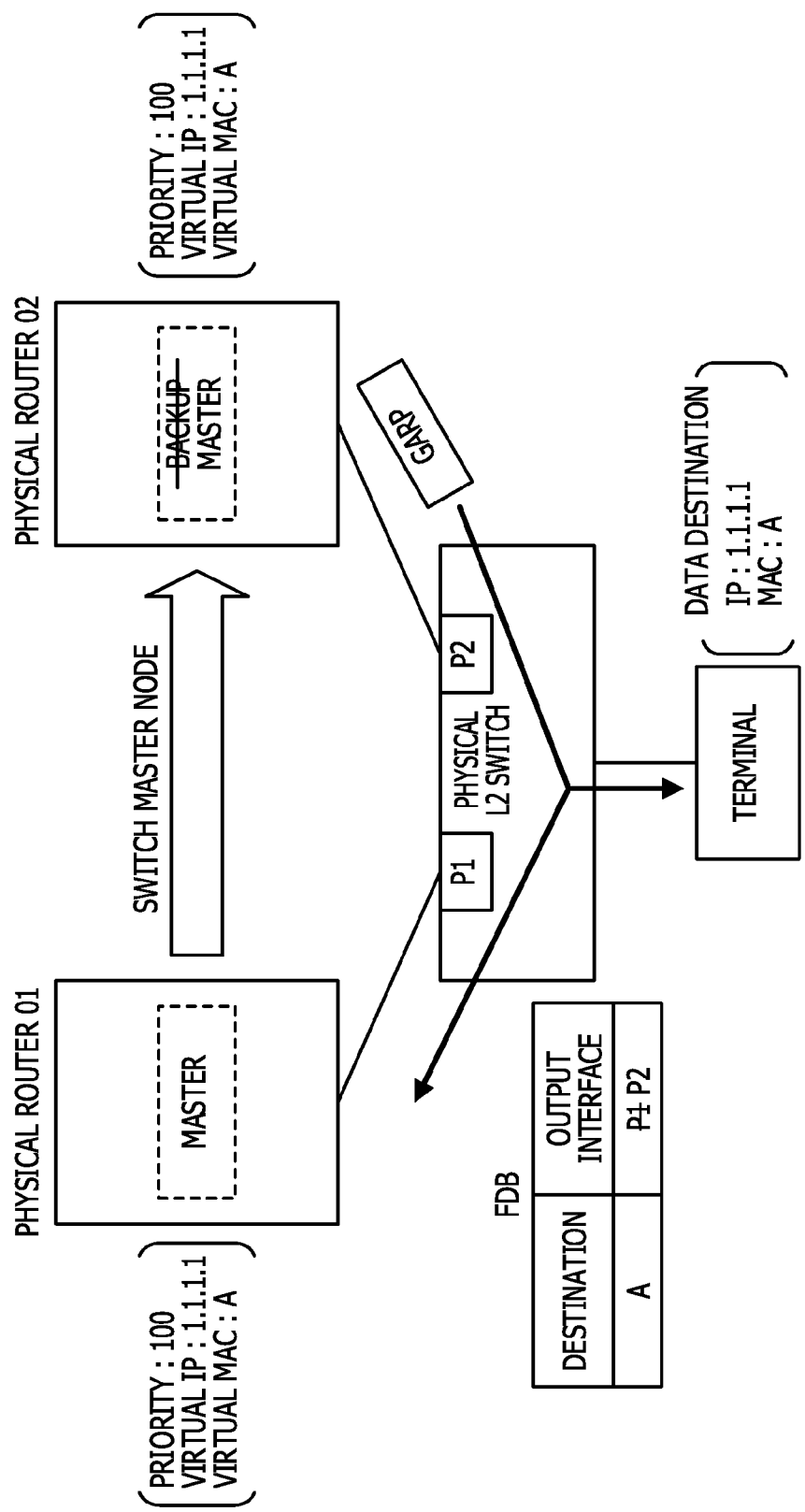
FIG. 26 is a diagram illustrating an example of switching of a master node due to a physical router failure.

FIG. 26 illustrates an example where a master node is switched by a failure in a physical router. In the example illustrated in FIG. 26, since a failure occurs in the physical router 01, the VRRP Advertisement message is no longer transmitted from the physical router 01. When the VRRP Advertisement message is not received for a predetermined period of time, the physical router 02 starts to operate as the master node. The physical router 02 transmits a Gratuitous ARP (GARP) packet to the physical L2 switch. The physical L2 switch updates the FDB based on the received GARP packet. To be more specific, the identification information of the output interface is changed from P1 to P2. Thus, the packet transmitted from the terminal 01 is transmitted to the physical router 02 that has started to operate as the master node.

Note that the backup node is switched to the master node not only when the VRRP Advertisement message is not received for the predetermined period of time but also when the priority included in the VRRP Advertisement message is lower than that of the backup node. On the other hand, when the priority included in the VRRP Advertisement message is higher than that of the master node, the master node is switched to the backup node.

Figure 27:
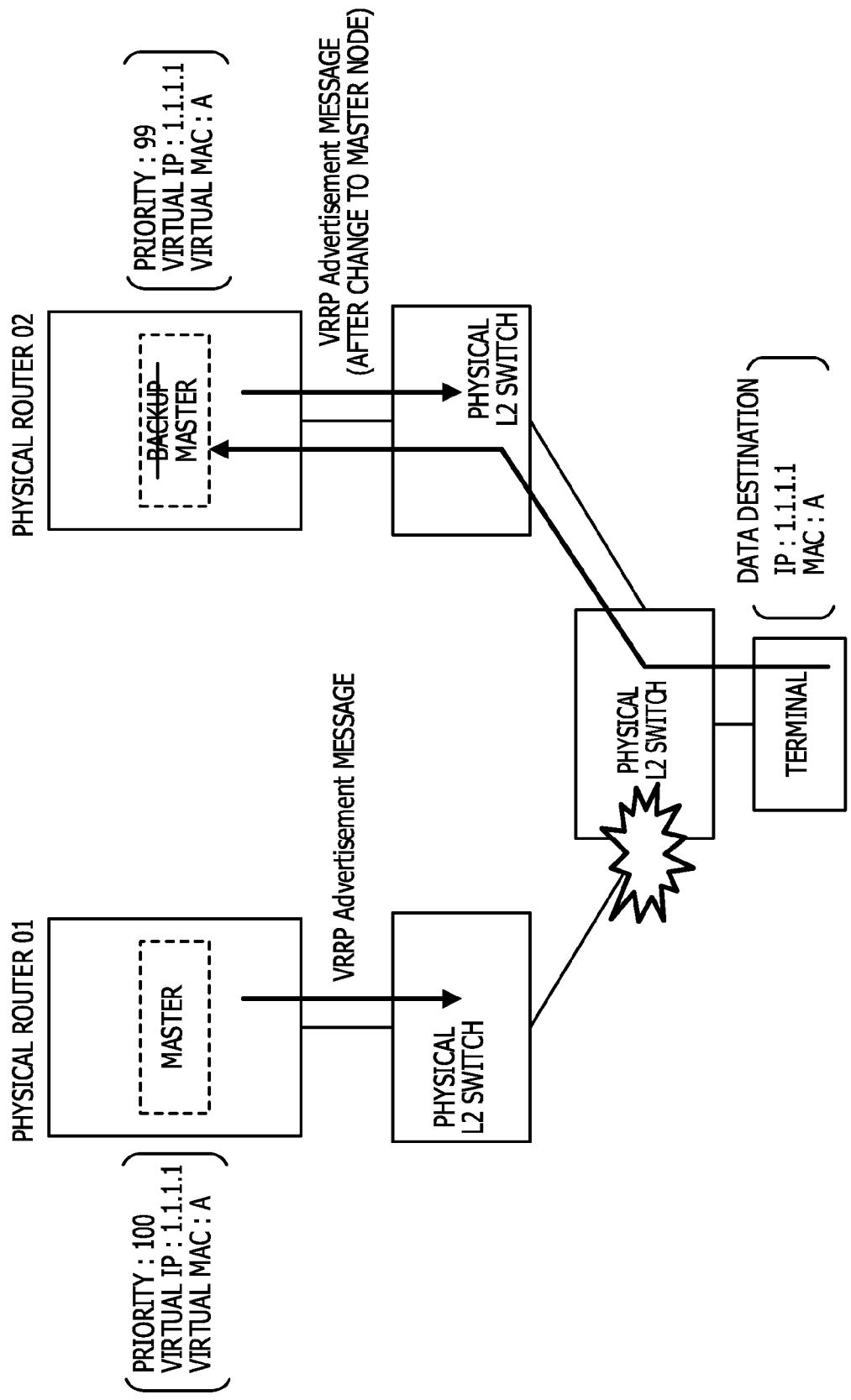
FIG. 27 is a diagram illustrating an example of switching of a master node due to a physical switch failure.

FIG. 27 illustrates an example where the master node is switched by a failure in the physical L2 switch. In the example illustrated in FIG. 27, the physical L2 switches are arranged in two stages. The VRRP Advertisement message transmitted by the physical router 01 that is the master node reaches the physical L2 switch coupled to the physical router 01 but does not reach the terminal due to a failure in the physical L2 switch coupled to the terminal. Accordingly, the physical router 02 does not receive the VRRP Advertisement message transmitted by the physical router 01. Thus, the physical router 02 starts to operate as the master node after the elapse of a predetermined period of time. After being switched to the master node, the physical router 02 transmits the VRRP Advertisement message. Note that the physical L2 switch coupled to the terminal transfers the packet received from the terminal to the physical router 02. Thus, there is no influence on communication.

Figure 28:
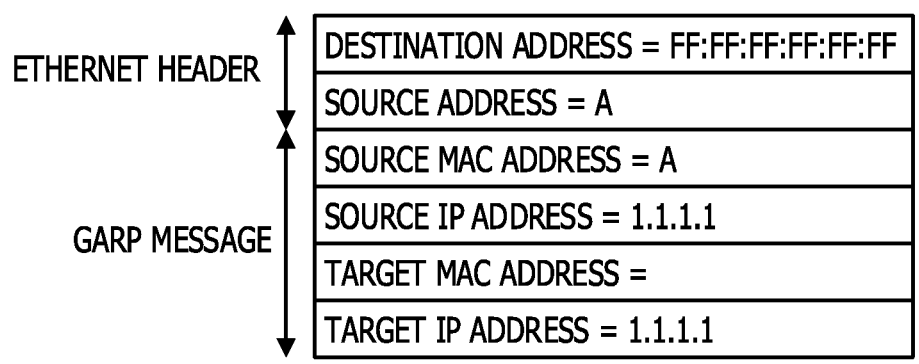
FIG. 28 is a diagram illustrating an example of a GARP packet.

FIG. 28 illustrates an example of the GARP packet. In the example illustrated in FIG. 28, an Ethernet header includes a destination address, that is, a destination MAC address here, and a source address, that is, a source MAC address here. A broadcast address is set as the destination MAC address, while a virtual MAC address of a VRRP group to which the source physical router belongs is set as the source MAC address. In the GARP message, the source MAC address, a source IP address, a target MAC address, and a target IP address are stored. The virtual MAC address of the VRRP group to which the source physical router belongs is set as the source MAC address. A virtual IP address of the VRRP group to which the source physical router belongs is set as the source IP address. Nothing is set for the target MAC address. A virtual IP address of the VRRP group to which the source physical router belongs is set as the target IP address.

Figure 29:
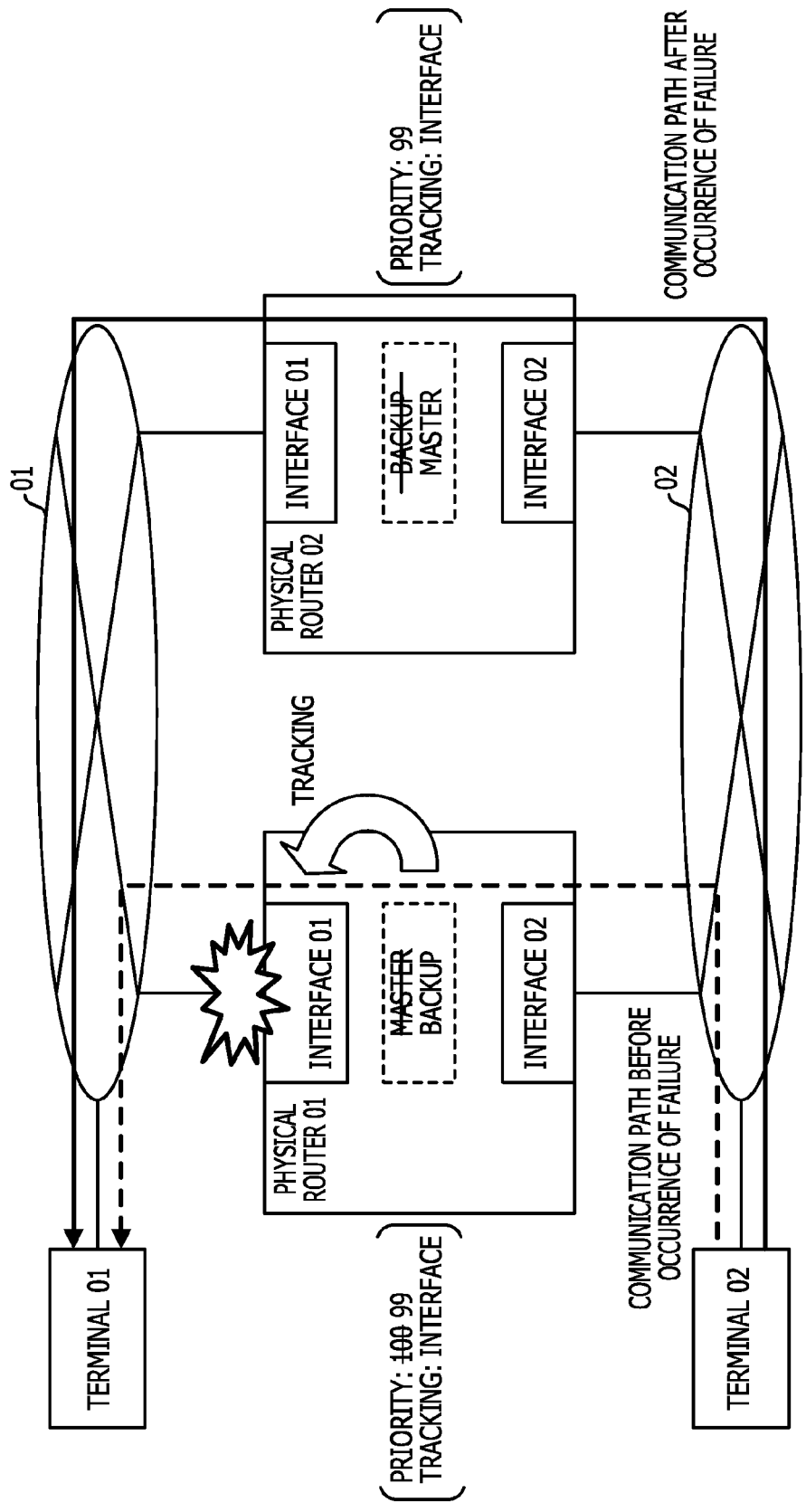
FIG. 29 is a diagram for explaining a tracking function.

A tracking function is one of the functions specified in the VRRP. With reference to FIG. 29, the tracking function is described. In FIG. 29, the terminal 01 is coupled to a network 01, and the terminal 02 is coupled to a network 02. The physical router 01 is coupled to the network 01 through an interface 01, and is coupled to the network 02 through an interface 02. The physical router 02 is coupled to the network 01 through an interface 01, and is coupled to the network 02 through an interface 02.

The tracking function is a function to switch the master node by lowering the priority of the VRRP upon detection of a failure in the interface by the master node. In the example illustrated in FIG. 29, the physical router 01 detects a failure in the interface 01 and lowers the priority from 100 to 90. As a result, the physical router 02 with the priority of 99 becomes the master node, and the physical router 01 becomes the backup node.

The embodiment of the present disclosure described above is summed up as follows.

The information processing apparatus according to this embodiment includes: a first port coupled to a first network; a second port coupled to a second network; a first virtual machine; routing units each configured to relay communication between a first information processor coupled to the first network and the first virtual machine or to relay communication between the first information processor and a second virtual machine in a second information processor coupled to the second network; a management data storage unit configured to store identification information of the ports and identification information of any of the routing units, which is influenced by a failure in any of the ports while associating the both identification information with each other; and a setting unit configured to specify, from the management data storage unit, a first routing unit that is the routing unit influenced by a failure when the failure occurs in any of the first and second ports, and to perform setting to cause a routing unit in a third information processor coupled to both of the first and second networks to relay communication by the first routing unit.

Such a configuration enables continued communication even when a failure occurs in a physical port.

Also, the information processing apparatus described above may further include a management unit configured to specify a port for each of the routing units, the port being used by the routing unit to relay communication data, and to store identification information of the routing unit and identification information of the specified port in the management data storage unit by associating the both identification information with each other. This configuration enables the data stored in the management data storage unit to be prepared beforehand.

Moreover, the first routing unit and the routing unit in the third information processor may be controlled by the VRRP. The setting unit described above may lower the priority of the first routing unit by a predetermined value. Such a configuration makes it possible to deal with a failure using the VRRP.

Furthermore, the respective routing units may belong to different VRRP groups, and the first routing unit and the routing unit in the third information processor among the routing units may belong to the same VRRP group. Such a configuration makes it possible to efficiently deal with a failure for each VRRP group.

Note that a program may be created to cause a computer to perform processing by the method described above. The program is stored in a flexible disk, a CD-ROM, a magneto-optical disk, a semiconductor memory, a computer-readable storage medium such as a hard disk or a storage unit. Note that an intermediate processing result is temporarily stored in a storage unit such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus comprising:
a first physical port coupled to a first network;
a second physical port coupled to a second network;
a first memory; and
a first processor coupled to the first memory and configured to:
execute routing processing including a first routing processing related to communication performed between the first processor and a first information processing apparatus coupled to the first physical port through the first network, the routing processing including a second routing processing,
execute the second routing processing which is related to communication performed between the first information processing apparatus and a second information processing apparatus coupled to the second physical port through the second network,
store information indicating a first redundancy routing group of the routing processing that is affected by occurrence of a failure in the first physical port, and store information indicating a second redundancy routing group of the routing processing that is affected by occurrence of a failure in the second physical port,
cause, when a failure occurs in the first physical port, a second apparatus coupled to both of the first network and the second network to execute the routing processing of the first redundancy routing group, and
cause, when a failure occurs in the second physical port, the second apparatus to execute the routing processing of the second redundancy routing group, wherein each of the first redundancy routing group and the second redundancy routing group is a group of virtual routers operated under a Virtual Router Redundancy Protocol (VRRP).

2. The apparatus according to claim 1, wherein
the second information processing apparatus includes a second processor performing as a virtual machine, and
the communication performed between the first information processing apparatus and the second information processing apparatus is performed between the virtual machine and the first information processing apparatus.

3. The apparatus according to claim 1, wherein the first processor is configured to:
acquire a correspondence relationship between the first physical port and the second physical port and the first routing processing and the second routing processing, and
specify, when the failure occurs in any of the first physical port and the second physical port, routing processing associated with the respective physical port in which the failure occurs from the first routing processing and the second routing processing.

4. The apparatus according to claim 3, wherein
the acquisition of the correspondence relationship between the first physical port and the second physical port and the first routing processing and the second routing processing includes:
selecting one of the first physical port and the second physical port that is used when transmitting first data by executing the first routing processing, and associating identification information of the selected physical port with the first routing processing, and
selecting one of the first physical port and the second physical port that is used when transmitting second data by executing the second routing processing, and associating identification information of the selected physical port with the second routing processing.

5. The apparatus according to claim 1, wherein
the first routing processing includes third routing processing related to communication performed from the apparatus to the first information processing apparatus and fourth routing processing related to communication performed from the first information processing apparatus to the apparatus, and
the second routing processing includes fifth routing processing related to communication performed from the second information processing apparatus to the first information processing apparatus and sixth routing processing related to communication performed from the first information processing apparatus to the second information processing apparatus.

6. The apparatus according to claim 5, further comprising a third information processing apparatus,
wherein the third information processing apparatus comprises a second memory, and
a second processor coupled to the second memory and configured to execute seventh routing processing equivalent to a specified routing processing,
wherein the first routing processing and the seventh routing processing are controlled by a Virtual Router Redundancy Protocol, and
in execution of the seventh routing processing, a priority set for the first routing processing is set to a value lower than that of a priority set for the seventh routing processing.

7. The apparatus according to claim 6, wherein
the first routing processing and the second routing processing belong to different Virtual Router Redundancy Protocol groups, and
the specified routing processing and the seventh routing processing belong to the same Virtual Router Redundancy Protocol group.

8. An information processing method comprising:
executing routing processing including a first routing processing related to communication performed between a first processor of an apparatus and a first information processing apparatus, the apparatus including a first physical port coupled to a first network and a second physical port coupled to a second network, the first processor being coupled to the first physical port through the first network, the routing processing including a second routing processing;
executing the second routing processing which is related to communication performed between the first information processing apparatus and a second information processing apparatus coupled to the second physical port through the second network;
storing information indicating a first redundancy routing group of the routing processing that is affected by occurrence of a failure in the first physical port, and storing information indicating a second redundancy routing group of the routing processing that is affected by occurrence of a failure in the second physical port,
causing, when a failure occurs in the first physical port, a second apparatus coupled to both of the first network and the second network to execute the routing processing of the first redundancy routing group; and
causing, when a failure occurs in the second physical port, the second apparatus to execute the routing processing of the second redundancy routing group, wherein each of the first redundancy routing group and the second redundancy routing group is a group of virtual routers operated under a Virtual Router Redundancy Protocol (VRRP).

9. The information processing method according to claim 8, wherein
the second information processing apparatus includes a second processor performing as a virtual machine, and
the communication performed between the first information processing apparatus and the second information processing apparatus is performed between the virtual machine and the first information processing apparatus.

10. The information processing method according to claim 8, further comprising:
acquiring a correspondence relationship between the first physical port and the second physical port and the first routing processing and the second routing processing; and
specifying, when the failure occurs in any of the first physical port and the second physical port, routing processing associated with the respective port in which the failure occurs from the first routing processing and the second routing processing.

11. The information processing method according to claim 10, further comprising:
selecting one of the first physical port and the second physical port that is used when transmitting first data by executing the first routing processing, and associating identification information of the selected physical port with the first routing processing, and
selecting one of the first physical port and the second physical port that is used when transmitting second data by executing the second routing processing, and associating identification information of the selected physical port with the second routing processing.

12. The information processing method according to claim 8, wherein
the first routing processing includes third routing processing related to communication performed from the apparatus to the first information processing apparatus and fourth routing processing related to communication performed from the first information processing apparatus to the apparatus, and
the second routing processing includes fifth routing processing related to communication performed from the second information processing apparatus to the first information processing apparatus and sixth routing processing related to communication performed from the first information processing apparatus to the second information processing apparatus.

13. The information processing method according to claim 12, further comprising:
executing seventh routing processing equivalent to the specified routing processing using a third information processing apparatus,
wherein the first routing processing and the seventh routing processing are controlled by a Virtual Router Redundancy Protocol, and
in execution of the seventh routing processing, a priority set for the first routing processing is set to a value lower than that of a priority set for the seventh routing processing.

14. The information processing method according to claim 13, wherein
the first routing processing and the second routing processing belong to different Virtual Router Redundancy Protocol groups, and
the specified routing processing and the seventh routing processing belong to the same Virtual Router Redundancy Protocol group.

15. An information processing system comprising:
a first information processing apparatus;
a second information processing apparatus; and
a third information processing apparatus,
wherein the first information processing apparatus includes a first physical port coupled to a first network, a second physical port coupled to a second network, a first memory, and a first processor coupled to the first memory,
the first processor being configured to:
execute routing processing including a first routing processing related to communication performed between the first information processing apparatus and the second information processing apparatus coupled to the first physical port through the first network, the routing processing including a second routing processing, execute the second routing processing that is related to communication performed between the second information processing apparatus and the third information processing apparatus coupled to the second physical port through the second network, store information indicating a first redundancy routing group of the routing processing that is affected by occurrence of a failure in the first physical port, and store information indicating a second redundancy routing group of the routing processing that is affected by occurrence of a failure in the second physical port, cause, when a failure occurs in the first physical port, a fourth information processing apparatus coupled to both of the first network and the second network to execute the routing processing of the first redundancy routing group, and cause, when a failure occurs in the second physical port, the fourth information processing apparatus to execute the routing processing of the second redundancy routing group, wherein each of the first redundancy routing group and the second redundancy routing group is a group of virtual routers operated under a Virtual Router Redundancy Protocol (VRRP).

16. The information processing system according to claim 15, wherein the third information processing apparatus includes a second processor performing as a virtual machine, and the communication performed between the second information processing apparatus and the third information processing apparatus is performed between the virtual machine and the first information processing apparatus.

17. The information processing system according to claim 15, wherein the first processor configured to acquire a correspondence relationship between the first physical port and the second physical port and the first routing processing and the second routing processing, and specify, when a failure occurs in any of the first physical port and the second physical port, routing processing associated with the respective physical port in which the failure occurs from the first routing processing and the second routing processing.

* * * * *